(12) United States Patent
Howard et al.

(10) Patent No.: US 6,857,004 B1
(45) Date of Patent: Feb. 15, 2005

(54) COLLECTIVE NETWORK PROCESSING SYSTEM AND METHODS

(75) Inventors: Kevin D. Howard, Louisville, CO (US); Gerard A. Verbeck, Boulder, CO (US); Scott A. Smith, Boulder, CO (US)

(73) Assignee: Massively Parallel Technologies, Inc., Boulder, CO (US)

( * ) Notice: Subject to any disclaimer, the term of this patent is extended or adjusted under 35 U.S.C. 154(b) by 702 days.

(21) Appl. No.: 09/603,020

(22) Filed: Jun. 26, 2000

Related U.S. Application Data

(60) Provisional application No. 60/188,659, filed on Mar. 10, 2000, and provisional application No. 60/141,208, filed on Jun. 25, 1999.

(51) Int. Cl.[7] .............................................. G06F 15/16
(52) U.S. Cl. ...................................... 709/201; 709/205
(58) Field of Search ................................. 709/205, 201; 718/108; 706/10

(56) References Cited

U.S. PATENT DOCUMENTS

| | | | |
|---|---|---|---|
| 5,166,674 A | | 11/1992 | Baum et al. |
| 5,224,100 A | * | 6/1993 | Lee et al. ................... 370/408 |
| 5,371,852 A | | 12/1994 | Attanasio et al. |
| 5,689,722 A | | 11/1997 | Swarztrauber |
| 5,758,144 A | | 5/1998 | Eberhard et al. |
| 5,860,010 A | * | 1/1999 | Attal .......................... 717/137 |
| 5,905,736 A | * | 5/1999 | Ronen et al. ................ 370/546 |
| 6,014,669 A | * | 1/2000 | Slaughter et al. ............. 707/10 |
| 6,117,180 A | * | 9/2000 | Dave et al. ................... 703/20 |
| 6,154,765 A | * | 11/2000 | Hart ............................ 709/201 |
| 6,163,855 A | * | 12/2000 | Shrivastava et al. ........... 714/4 |
| 6,167,428 A | * | 12/2000 | Ellis ........................... 709/201 |
| 6,295,573 B1 | * | 9/2001 | Bailey et al. ................ 710/260 |
| 2001/0011294 A1 | * | 8/2001 | Ellis ........................... 709/201 |
| 2003/0135614 A1 | * | 7/2003 | Hattori et al. ............... 709/224 |

OTHER PUBLICATIONS

Thibodeaux, "organizers hope to give Lafayette superstart in high–tech direction", 10/27, Supercomputeronline.com, 2 pages.*
IBM, "Cluster–Based Stack Optimization Algorithm for Very Large–scale Integration", 09/87, IBM Technical disclosure Bulletin, vol. 30, Issue 4, p. No. 1445–1447 (4).*
Chong et al, "Concurrent Processing for Picture Archiving and Comunication system (PACS)", 06/95, IEEE, p. No. 468–472.*

(List continued on next page.)

Primary Examiner—Bunjob Jaroenchonwanit
(74) Attorney, Agent, or Firm—Lathrop & Gage, L.C.

(57) ABSTRACT

Methods and systems are provided for accelerating execution of programs of the type run by individuals or companies. The methods include the steps of communicating at least one program function to a library in data communication with the program and transmitting the function to a computing facility, typically in the form of computer clusters. The function is processed at the computing facility and results are relayed back to the user of the programs. Users of the invention pay for accelerated execution by one of several interfaces, such as through on-line transactions and/ or through prearranged ISP connectivity. Accelerated processing is initiated, typically, by clicking on a computer icon; and results appear seamlessly—though accelerated—to the user. The clusters of the invention can mix and match computers of different processing speeds to maximize the MIPS per dollar in processing accelerated functions for users.

23 Claims, 14 Drawing Sheets

OTHER PUBLICATIONS

Antaki et al, "The sóft side of New Enterprise", 05/99, MIT enterprise FORUM of Dallus Network Inc., 2 pages.*

Hitachi, "The Next Generation of Information Technology", spring 97, Hitachi today No. 39, p. No. 1–6 and cover page.*

Kahaner, "Fujitsu's $2^{nd}$ Parallel computing WS (PCW'93) 11/93 Kawasaki Japan" 12/93, 15 pages.*

Ryan et al, "A Scalable Distributed Multimedia Knowledge Retrieval System on a cluster of Heterogeneous High Performance Architectures", International Journal on artificial intelligence tools, vol. 9, No. 3 (2000) p. No. 343–367.*

(author unknown), "CAD comes on line", Feb. 21, 2000, p. s–28, Design News–Automotive.

Danny Hillis, "Massive, Parallel Supercomputers—Where they're Going—How They'll Work", Forbes ASAP, Feb. 22, 1999, pp. 60–62 and 64.

Internet Information article: "MSC.SOFTWARE Announces visualNastran 4d2Go; A total Engineering Solution to be Bundled with CAD Products", Mar. 6, 2000.

PCT Notification of Transmittal of the International Search Report or the Declaration, Dec. 26, 2000.

Cohen, ED et al. Efficient Covexity and Domination Algorithms for Fine–and Medium–Grain Hybercube Computers, Algoithmica, vol. 7, pp. 51–75, Springer Vertag New York, Inc., 1992.

Benedicts, E.P., "Multiprocessor architectures are converging", Hypercube Concurrent Computers and Applications: Proceedings of the third conference on Hypercube concurrent computers and applications: Architecture, software, computer systems, and general issues, vol. 1, pp. 12–20, Pasadena, California, Jan. 19–20 (1988).

Livingston, Marilyn L. and Stout, Quentin F., "Fault Tolerance of the Cyclic Buddy Subcube Location Sceme in Hypercubes", Proceedings of the 6th Distributed Memory Computing Conference (1991), IEEE, pp. 34–41, 1991.

Fox, G.C., "What have we learnt from using real parallel machines on real problems?", Hypercube Concurrent Computers and Applications: Proceedings of the third conference on Hypercube concurrent computers and applications: Architecture, software, computer systems, and general issues, vol. 2, pp. 897–955, Pasadena, California, Jan. 19–20 (1988).

"Topologies—computational messaging for multicomputers", Hypercube Concurrent Computers and Applications: Proceedings of the third conference on Hypercube concurrent computers and applications: Architecture, software, computer systems, and general issues, vol. 1, pp. 580–593, Pasadena, California, Jan. 19–20 (1988).

* cited by examiner

LEVEL 0 (HOWARD CASCADE, WIDTH ONE)

LEVEL 0 (HOWARD CASCADE, WIDTH TWO)

LEVEL 1

LEVEL 0 (HOWARD CASCADE, WIDTH THREE)

LEVEL 1

LEVEL 2

WHERE
$Strip_1 = T_{1.1}, T_{1.2}, T_{1.1.1}$
$Strip_2 = T_{2.1}$
$Strip_3 =$

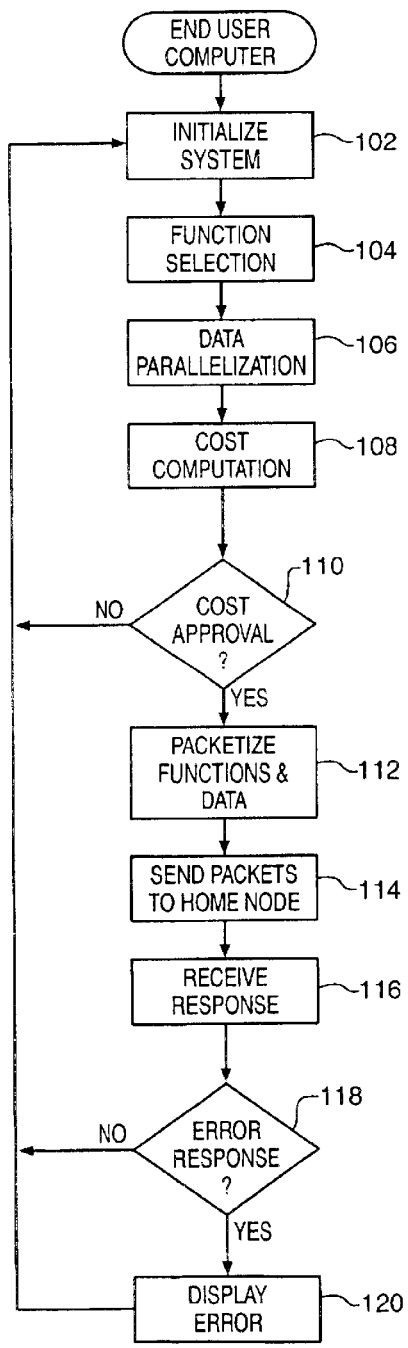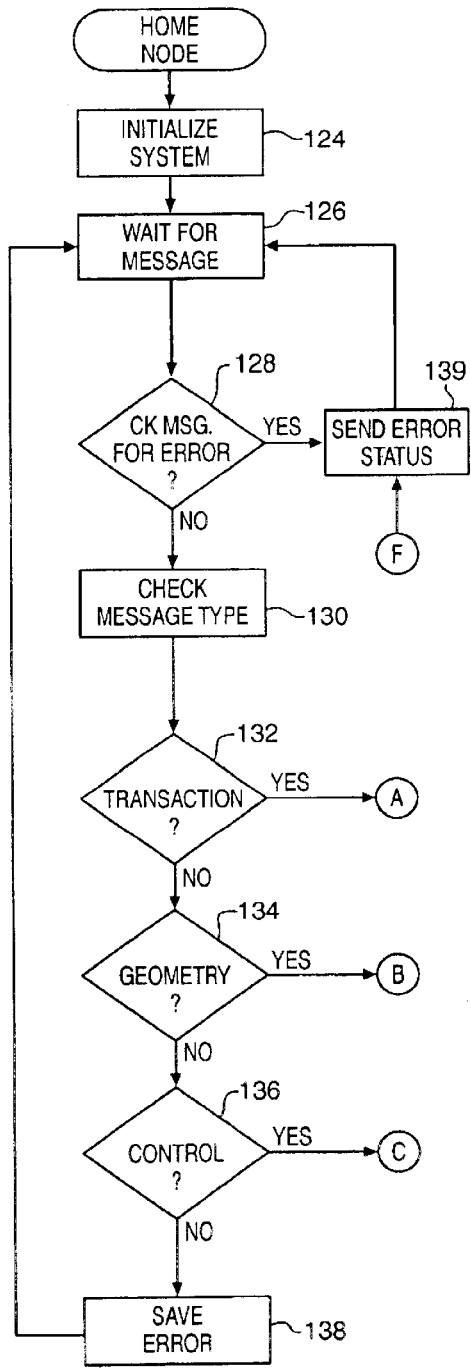
FIG. 5
FIG. 5A

COLLECTIVE NETWORK PROCESSING SYSTEM AND METHODS

This application claims priority to commonly-owned and co-pending U.S. Provisional Application Nos. 60/141,208, filed Jun. 25, 1999, and 60/188,659, filed Mar. 10, 2000, each of which is hereby incorporated by reference.

BACKGROUND OF THE INVENTION

High performance computers are known in the art such as provided by CRAY®, Thinking Machines Corporation, Silicone Graphics Company, and IBM Corporation. High performance computing provides several known benefits; it is, however, expensive and generally unavailable to everyday users. Accordingly, most individuals and companies do not typically benefit from supercomputing, even though tasks and processing tasks could be completed more quickly.

SUMMARY OF THE INVENTION

It is, accordingly, one object of the invention to provide system and methods for high performance computing through a novel massively connected computers available to businesses and individuals "on demand." Another object of the invention is to provide massively parallel computing through the Internet, preferably through Internet Service Provider billing and augmented nodes. Yet another object of the invention is to provide methodology for linking computers to supercomputing facilities for on-demand processing of functions and programs. These and other objects will be apparent in the description which follows.

The following patents and articles provide useful background of the invention and are hereby incorporated by reference as if fully contained herein: Hypercube Concurrent Computers and Applications Proceedings of the third conference on Hypercube concurrent computers and applications (Vol. 1), Pasadena, Calif., Jan. 19–20 (1988); In Algorithmica 7 (1992), pp. 51–75; Efficient Convexity and Domination Algorithms for Fine- and Medium-Grain Hypercube Computers, Ed Cohen, R. Miller, E. Cohen, Dept. of Computer Science, State University of New York at Buffalo; In Proc. 6th Distributed Memory Computing Conf. (1991), IEEE, pp. 34–41; and U.S. Pat. No. 5,689,722, issued Nov. 18, 1997, to Swartzrauber.

In one aspect, the invention provides a method for accelerating the execution of a computer program used by an entity. By way of example, an entity is a company, business or an individual. The entity typically has an authority, e.g., a CEO or a company cost accounting professional, that makes decisions for the entity. If accelerated execution is desired, then programs and/or functions from the entity are processed through a computing facility networked with the entity. For example, the entity is linked to the facility via the Internet. In one aspect, the computing facility has one or more clusters of computers (hereinafter "cluster"); and preferably one group, or even a cluster, of computers, or processors, is linked together to form the Home Node to facilitate processing by the cluster. The entity pays for use of the computing facility by one or more transactions. For example, the entity can pay for as-needed use of the computing facility, or the entity can contract with the entity for dedicated partial or entire use of the computing facility. Transactions can also be priced based upon processing MIPS desired by the entity.

In one aspect, the computing facility is linked with a controller (e.g., a company) responsible for transactions through the computing facility. In one aspect, transaction costs of using the computing facility are borne by the entity through a "900" number telephone transaction that in turn pays the controller. In still another aspect, transaction costs are paid for by the entity through a credit card transaction. In yet another aspect, supercomputing transaction costs are borne by Internet Service Provider fees linking the entity with the controller and/or computing facility.

In one aspect, the invention provides free Internet access through an Internet Service Provider ("ISP") linked to the controller. Specifically, in one aspect, the computing facility is made up of an array of Internet-connected computers that are part of the ISP. The controller utilizes the array of computers to perform the supercomputing functions described herein. As such, this array of computers is denoted herein as a "virtual cluster" of computers, but operates as a cluster described herein. In exchange for use of a computer within the cluster, a user of the computer is provided with free Internet access. In effect, his computer is "shared" with other computers in the virtual cluster to provide supercomputing as described herein. This sharing only accounts for part of the processing capability of the computer and the user is still afforded service through the ISP.

The method of one aspect includes the following steps: communicating at least one program function to a library in data communication with the program; transmitting the function to a computing facility; processing the function at the computing facility; transmitting results associated with processing the function from the computing facility to the entity; and translating the results to a language compatible with the program. A computing facility of one aspect includes a network of computers such as computers arranged in a cluster. In still another aspect, the cluster is formed by an array of computers linked as a hypercube configuration. In another aspect, the cluster is formed into a special cascade configuration, denoted herein as the "Howard Cascade," to perform the high performance computing functions herein.

The method of another aspect includes the following additional steps: calculating a cost for executing and processing the function; informing the authority of the cost; and receiving permission from the authority to process the function. These steps are used for those entities which do not have pre-arranged payment schemes with the computing facility.

The invention provides several advantages. By way of example, software manufacturers can now provide customers with high performance computing capability through a network of processors to greatly accelerate the processing speed and overall sophistication of their existing applications, without being constrained by the hardware limitations of the equipment on which the software is installed. In addition to the performance increase, the invention also provides software manufacturers the opportunity to earn a recurring stream of income as their software is used to access high performance supercomputing power.

The processing power provided for by the invention represents a powerful paradigm shift for software manufacturers. Manufacturers have already begun to recognize the shift in revenue streams by marketing their software through the use of Application Service Providers, or ASP's, in which users access the software through web-sites, and pay for software use through connect and time charges. With the invention, accordingly, accessing ASPs can now be tied to varying levels of computing power. Depending upon the computational needs or desires of the end user, a software vendor can also realize different levels of income, depending on the level of power utilized by the customer.

By way of example, industries involved in image processing already demand extremely intensive computing power. With some of the more sophisticated applications already available, it is not unusual for users to set up the processing they require during the day, and let the computer complete the processing overnight, as the processing can take eight or more hours. By utilizing the invention, software manufacturers can now provide this same level of processing in a matter of seconds. This represents an advance that vastly improves the amount of work that a single image processing station could accomplish on a daily basis. Not only does the invention increase the speed of image processing, for example, but it also allows for the execution of problems of much greater sophistication.

In one aspect of the invention, several clusters of computing devices (i.e., multiple computers configured to act as a larger computer) are connected for massively parallel computing of programs over the Internet, or through direct links by end users of compatible software. The exact nature of the entire process is quite opaque to the end user—they will simply be aware that, by clicking on an icon on their computer screen, and agreeing to a certain fee structure, their software becomes far more powerful and better performing than any previous version they have used.

The invention also provides software, for coupling by software manufacturers, to easily access to super computing sources (e.g., the computing facility described above). A library of code further provides the software manufacturers with the ability to seamlessly interface with the computing facility with a minimum of modification and effort. In one aspect, the software used by software manufacturers takes the form of a Dynamic Link Library, of "DLL," known in the art.

The speed of the processors used in a cluster of the invention has a direct bearing on the overall speed of the cluster. Likewise, the number of processors used in a cluster is also a factor in determining the overall speed of the cluster. The third factor that has a bearing on cluster speed is known as "architectural overhead." The architecture of a cluster not only includes the physical topology of the system, but also the software technology employed in the connectivity, which dictates how efficiently data is being distributed between processors in a cluster. Connectivity is typically not one hundred percent efficient, and it is the overhead associated with connectivity that slows the cluster. The prior art used in a complex router, plus a group of partial differential equations, to distribute internodal data. This complexity of the prior art indicates that the addition of one processor provided less than one processor's worth of computer power. Further, in the prior art, the efficiency of adding additional processors decreased with the number of processors added. The invention described herein uses the logical topology of a switch-interconnected Howard Cascade to ensure that free physical lines are always available. Using a linear load factor of approximately 1.2 is a reasonable overhead estimate associated with the invention. This factor is quite efficient when compared to prior art allocation methods, and is the result of using a mathematical cascade in allocating the problem sets among nodes for processing and defining internode timing.

When system overhead is linear, then the speed of individual processors used in a cluster is directly proportional to the overall speed of the cluster. However, processing speed is not directly proportional to the cost of processors. In other words, it can be more economically efficient to build a cluster with slower processors than with faster processors if the slower processors provide more "MIPS per dollar" than the faster processors. In fact, this is most often the case in today's market. The market pays a premium for processing speed, which is to be expected in a single processor environment. As a result, relatively slow processors can be exceedingly cheap, which helps to contribute to the economic viability of very large arrays of processors. By way of example, the invention of one embodiment uses 5,000 processor cluster operating with 66 MHz processors, each of which will process approximately 111.6 Million Instructions Per Second ("MIPS"), computed using the Drystone 1.1 model. By contrast a modern 133 MHz processor processes approximately 218.8 MIPS. Utilizing an overhead-slowing factor of 1.2, a 5,000 66 MHz processor cluster will process instructions at a speed of approximately 465,000 MIPS (465 Billion Instructions Per Second, or 465 "GIPS"). This is calculated by multiplying 111.6 MIPS by 5,000 (the number of processors) and dividing by 1.2 (the overhead slowing factor). A 133 MHz processor running at 218.8 MIPS for an hour will process approximately 787,680 Million Instructions (788 Billion Instructions), which is calculated by multiplying 218.8 MIPS by 3,600 seconds. The intended 5,000 processor cluster, operating at 465 GIPS would process 1023 Billion Instructions in approximately 1.7 seconds. This is calculated by dividing 788 Billion Instructions (the amount generated by one hour of processing on a 133 MHz processor) by 465 GIPS (the number of instructions per second generated a 5,000 processor 66 MHz cluster). Thus a customer utilizing the invention supported by a 5,000 processor cluster could process in just 1.7 seconds what would otherwise take approximately an hour on a relatively fast 133 MHz machine.

Pricing such an increase in performance depends in large measure upon the value of the time saved. In most production operations, time is not only valued in terms of the hourly rate of the technician or engineer utilizing the software, but also in terms of the general overhead associated with the operation, as well as the value of turning around a project in a timely manner. Preferably, in one aspect of the invention, a set fee is charged for processing of one Trillion Instructions (which is 1,000 Billion Instructions, as contrasted to the 1023 Billion Instructions involved in the above one-hour processing illustration). A flat connect fee is preferably used to cover solutions of instructions involving less than 512 Million Instructions.

In one aspect, a customer buys exclusive rights to time on a cluster. This option allows a user to purchase either the entire cluster or a set number of cluster nodes for a prearranged amount of time at a prearranged date and hour.

In another aspect, a customer buys non-exclusive time blocks on a cluster. This option allows a user to purchase cluster time at a pre-arranged number of MIPS; and the cluster can still run other jobs on the cluster.

The invention thus has several advantages, which should be even more apparent in the description and drawings that follow. One specific advantage is that the invention supports the methods of an elective service provider (ESP). Unlike an ISP (Internet service provider), which simply connects a user to the Internet, or an ASP (application service provider), which forces a user to pay every time he uses the software, an ESP enables the end-user to enhance the performance of software as needed. In other words, the user of software buys or leases the right to use software as he currently does; then, through an ESP, he economically enhances the performance of that software to a desired degree, in accordance with the teachings of this

BRIEF DESCRIPTION OF THE DRAWINGS

A more complete understanding of the invention may be obtained by reference to the drawings, in which:

FIG. 5 shows one processing flow for use with the invention and particularly involving steps taken at a computer seeking accelerated processing of programs;

FIG. 5A shows one processing flow for use with the invention and particularly involving steps taken at a Home Node, e.g., a controller, of the invention;

DETAILED DESCRIPTION OF THE DRAWINGS

Figure 1:
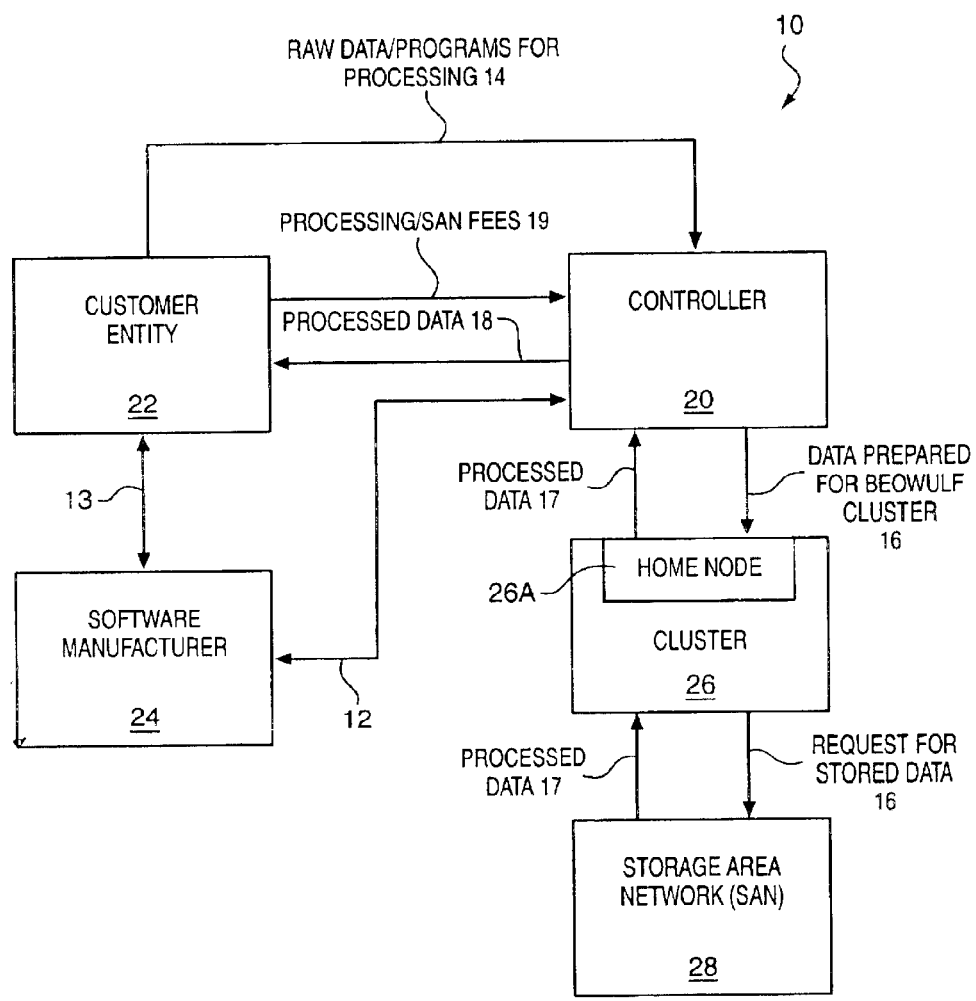
FIG. 1 illustrates a transaction flowchart applicable in utilizing one or more embodiments the invention.

FIG. 1 shows one system 10 constructed according to the invention and interconnected via transactions described below. Block 20 represents the controller (e.g., a company) responsible for facilitating supercomputing for customer entities desiring supercomputing. A typical customer entity is illustrated by block 22. Supercomputing is performed in block 26 labeled "Cluster." A cluster of the invention includes an array of computers (i.e., "nodes") coupled together in a parallel processing fashion; and preferably includes an array of computers coupled to one or more switches facilitating data processing through the various nodes, as described herein. Cluster 26 also preferably includes a "Home Node 26a" as described in more detail below.

In transaction 12, controller 20 licenses the Software Manufacturer (block 24) to couple the invention with its software; and controller 20 receives, in exchange, licensing fees from Software Manufacturer 24. Software Manufacturer 24 then sells its software (hereinafter identified as "speed-enhanced software," as the Manufacturer's software is modified to operate in conjunction with the invention) to customer 22, in transaction 13, receiving income from the sale of the speed-enhanced software.

In transaction 14, customer entity 22 sends data (and/or programs) to controller 20 by using its speed-enhanced software. Typically, transaction 14 occurs over the Internet, a virtual private network, LAN, WAN or other network. In the preferred embodiment, customer entity 22 is automatically charged a fee, either through its Internet provider or through the phone company, for access to cluster 26. Controller 20 readies the data from transaction 14 for processing, sets the parameters for utilization of cluster 26, and sends the data in for processing, in transaction 16. Data processed by cluster 26 comes back to controller 20, in transaction 17, and is sent back to the customer entity 22 in transaction 18. The entire process of transaction 14–18 takes a fraction of a second (or longer, depending upon the complexity of the data or program to be processed) and numerous transactions can be processed simultaneously. Those skilled in the art should appreciate that transactions can be linked in a different manner—e.g., entity directly to cluster 26—without departing from the scope of the invention.

In an alternative embodiment of the invention, controller 20 sells SAN ("storage area network") solutions to customer entity 22, receiving consulting fees in return, via transaction 19. Specifically, customer entity 22 stores its data in the SAN (block 28); and controller 20 receives a fee for the storage as indicated by transaction 19. In operation, customer entity 22 sends a problem for processing to controller 20 by using its speed-enhanced software. Controller accesses stored data in SAN 28 in completing the processing request and receives a fee for the processing.

Figure 2:
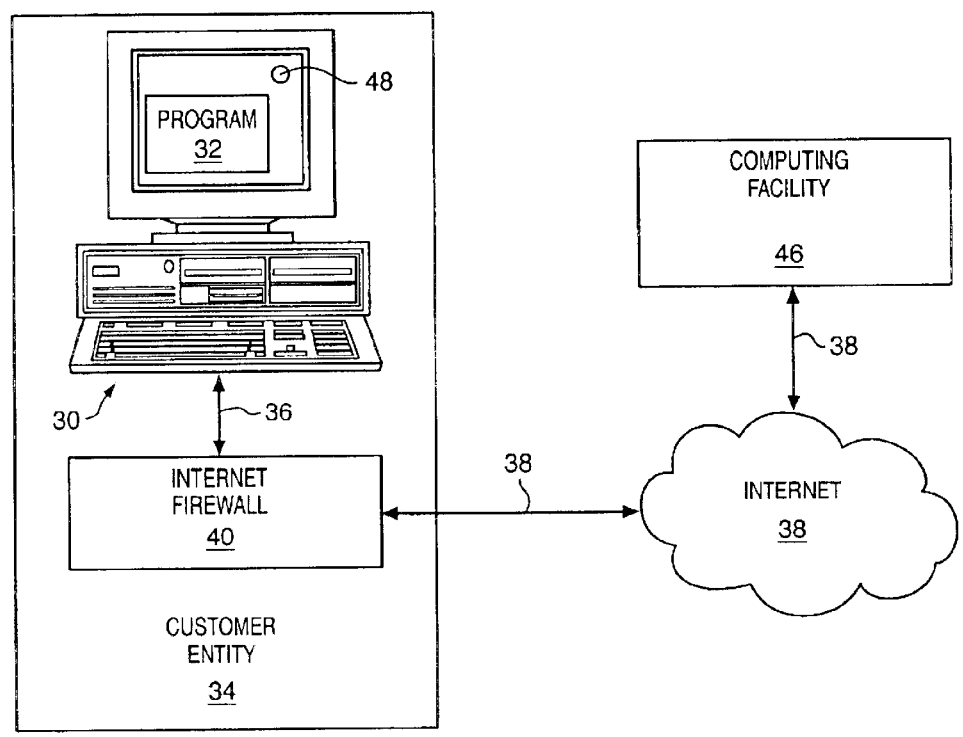
FIG. 2 illustrates one transaction operation according to the invention.

In operation, the invention of one embodiment operates as shown in FIG. 2. A user at a computer 30 desires to process a program 32. Program 32 is of the type that is processed or supported by speed-enhanced software, such as from software manufacturer 24, FIG. 1. Computer 30 is typically within a firm or company 34, such as a customer entity 24, FIG. 1. Computer 30 typically communicates within entity 34 via a protected LAN 36; and further communicates to the Internet 38 through a company firewall 40. If desired, the user at computer 30 can request accelerated processing of program 32, through computing facility 46, by clicking on icon 48. Icon 48 is typically shown on computer 30 when the user operates or uses speed-enhanced software. Computing facility 46 for example represents the controller 20, cluster 26, and/or SAN 28 of FIG. 1, or for example represents connectivity to a cluster and/or LAN. Those skilled in the art should appreciate that functionality of LAN 36 and Internet 38 can be provided through other networks; and that firewall 40 is not required.

The invention of FIG. 1 and FIG. 2 thus facilitates use of Internet accessible non-homogeneous computers for one or more massively parallel computers. The invention solves certain problems of the prior art by increasing the connection speeds of the lowest level computers and by removing the problems associated with computer disconnects, providing super-computer class processing speeds using Internet connected computers.

Figure 3:
FIGS. 3, 3A and 3B illustrate different computer connectivity setting forth a Howard Cascade Effect, in accord with the invention.
Figure 3A:
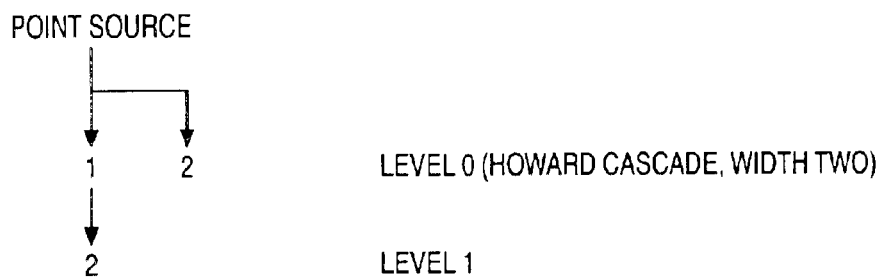
Figure 3B:
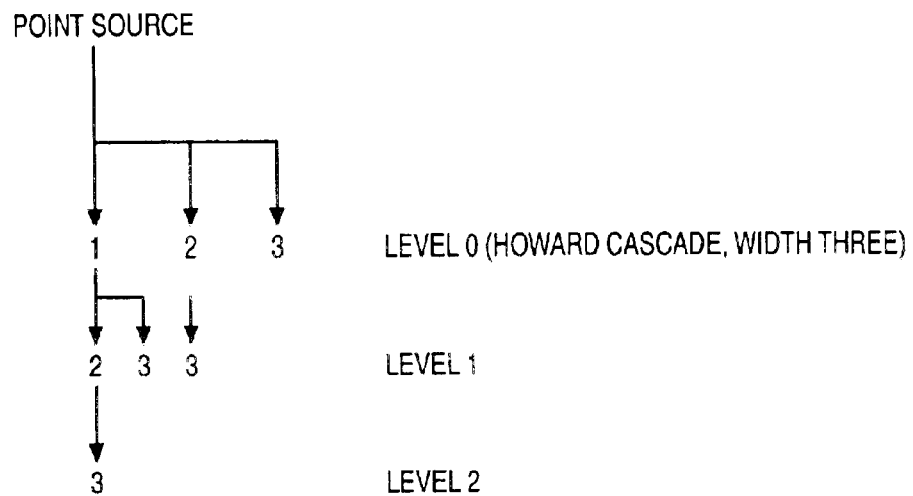

In the preferred embodiment, the invention uses the "Howard Cascade Effect," described below, to increase the relative parallelism found in an array of Internet connected computers. Consider for example a point source (e.g., a single computer) for a given computational problem. Since it is desirable to connect additional computers with the point source to solve the problem, then inherent parallelism of the system solution is desirable. FIG. 3, 3A, 3B illustrate three sets, respectively, of connectivities illustrating the Howard Cascade effect. Level "0" defines the cascade width. Howard Cascade effect computer connectivities are preferably incorporated within a cluster, e.g., cluster 26, FIG. 1, or within computing facility 46, FIG. 2. In FIG. 3, one computer is illustrated as a single cascade, with a single width, and depth, relative to the point source. FIG. 3A illustrates connectivity of three computers relative to the point source, resulting in a Howard Cascade effect of width "two" and depth "two." FIG. 3B shows connectivity of seven computers relative to the point source, resulting in a Howard Cascade effect of width "three" and depth "three." Those skilled in the art should appreciate that continued connectivity can be built through larger Howard Cascade computer connectivities.

More particularly, each number "1, 2, 3" of FIG. 3, 3A, or 3B represents a computer or operational thread on a computer. A thread is logical process which consumes a certain amount of computer processor, processing bandwidth. In addition the number also represents the number of time ticks used to access that computer or thread. In FIG. 3B, for example, the point source only communicates with three of the seven computers. By the time the point source finishes communicating with the third computer, all seven computers are working to solve the problem.

As set forth in Table I, a Howard Cascade preferably utilizes one or more of the following assumptions to compute the relative efficiency of computer connectivity configurations from the point source to connected computers: (a) zero data is transferred between nodes; (b) processing of the problem takes one time unit; and (c) a transitioning call to a computer takes one time unit. Assumption (a) can be eliminated if an adequate number of input channels are available at the point source to allow the "called" computers parallel access to the data. Efficiency is defined herein as the ratio between the sequential processing speed to the cascade processing speed, similar to a multiplier. It should thus be apparent that not all numbers of computers are supported by a single Howard Cascade. The numbers found in the "number of computers" column, Table I, illustrate the general possible sequences for the Howard Cascade. The computer listing in Table II provides an example of how to compute the number of computers supported with the Howard Cascade.

TABLE I

Howard Cascade Effect Efficiencies

| Number of Computers | Sequential Processing Time | Howard Cascade Processing Time | Efficiency of Cascade |
| --- | --- | --- | --- |
| 1 | 2 | 2 | 1 |
| 3 | 6 | 4 | 1.500 |
| 7 | 14 | 6 | 2.333 |
| 15 | 30 | 8 | 3.750 |
| 31 | 62 | 10 | 6.200 |
| 63 | 126 | 12 | 10.500 |
| 127 | 254 | 14 | 18.143 |
| 255 | 510 | 16 | 31.875 |
| 511 | 1022 | 18 | 56.778 |
| 1023 | 2046 | 20 | 102.300 |
| 2047 | 4094 | 22 | 186.091 |
| 4095 | 8190 | 24 | 341.250 |
| 8191 | 16382 | 26 | 630.077 |
| 16383 | 32766 | 28 | 1170.214 |

TABLE II

Computer Listing Illustrating Howard Cascade Function

```
unsigned long howardCascade (unsigned long cascadeWidth)
{
    //*
    //* Define Automatic Variables
    //*
    unsigned long numberOfComputers = cascadeWidth;
    //*
    //* Compute the number of computers as a function of
    //* the cascade width
    //*
    while (cascadeWidth- > 1)
        numberOfComputers = howardCascade (cascadeWidth);
    return (numberOfComputers);
}// end howardCascade
```

In order to support any number of computers/threads with the Howard Cascade, a translation occurs typically in the following form.

$$N = H(x) + \ldots + H(y) + H(z)$$

where:

N=The number of computers/threads

H( )=The Howard Cascade Function x,y,z=The function level

This forms allow any integer to be represented as the sum of Howard Cascades.

Examples:

00=H(0)=0

01=H(1)=1

02=H(1)+H(1)=1+1

03=H(2)=3

04=H(2)+H(1)=3+1

05=H(2)+H(1)+H(1)=3+1+1

06=H(2)+H(2)=3+3

07=H(3)=7

08=H(3)+H(1)=7+1

09=H(3)+H(1)+H(1)=7+1+1

10=H(3)+H(2)=7+3

The Howard Cascade does more than distribute problem sets through the cluster; it also time aligns groups of processors or threads. For example, all processors or threads with the same number (see, e.g., FIG. 3) occur at the same time. Because of the a priori knowledge in which processors or threads are aligned in time, and by insuring that the connection between the processors or threads is via switching hardware, internodel transfer of data can occur efficiently without resorting to the set of partial differential equations required for data distribution found in the prior art.

Because the data distribution problem becomes more difficult when the nodes (processors or threads) are passing information amongst themselves, the following description provides for how this may be handled. There are four known methods of passing information: one to one, one to many, many to many, and many to one. The one to one method of information passing requires a single pair of nodes known as the source and destination nodes. In order to pass information effectively both the source and destination nodes need to be time synchronized. As can be seen in FIGS. 3A and 3B those nodes shown at time step 2 are time synchronized as well as those nodes shown at time step 3. Further, each of these nodes is guaranteed to have a clear channel. Thus as long as the pairs are time aligned via the Howard Cascade, point to point data transfer occurs without waiting and with clear a priori node pairing locations. The one to many information passing method works similarly to the one to one information transfer method. As long as the associated time synchronized nodes are used in the one to many information passing then we are guaranteed to have clear channels among all of the nodes. Because the invention preferably use TCP/IP for internodal communication, for one to many information transfer the IP broadcast and multicast options are used to send data in parallel to the proper destinations. Many to many information transfer performs like several one to many information transfers. Many to one information transfers require different processing depending on why the many to one relationship exists. For example: representing a multiple precision value of a transcendental function requires that function to be represented as a series where components of the series are added/subtracted to produce a single multiple precession instance of the function. Since all components of the series are summed, this can be thought of as a many to one relationship. However, the summing can take place as several discrete one to one relationships, thus any many to one relationship which can be represented as a discrete one to one relationships will be. Almost all current mathematical functions which are used in parallel processing fall into this category. Those few that do not will not run efficiently on any parallel processing system. The above description indicates that the invention is able to handle mathematical functions used in parallel processing more efficiently than the existing art. Those skilled in the art should appreciate that other clusters, cascades and supercomputing.

Figure 4:
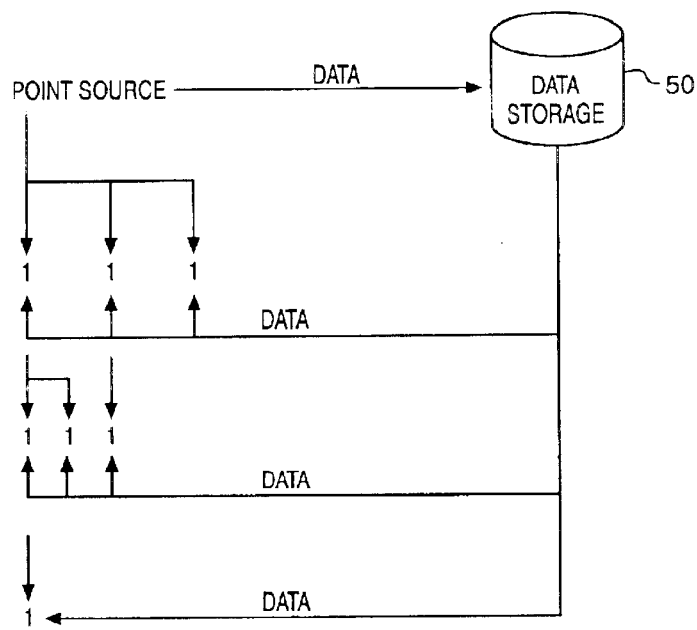
FIG. 4 illustrates data flow and storage for a seven computer Howard Cascade configuration, in accord with the invention.

FIG. 4 further illustrates the seven connected Howard Cascade configuration. Because of the fill time and the processing time (i.e., assumptions b and c above), three channels are at most utilized. That is, at any one time only three of the seven computers request data in parallel. Data storage 50, typically in the form of RAM, can for example reside in SAN 28, FIG. 1, or within computing facility 46, FIG. 2. In general, the number of parallel data channels used to maintain parallel processing, concurrently with moving data (if the data is approximately the same size and the transfer rates are approximately the same), with a Howard Cascade is equal to the cascade width. Thus, as shown in the last row of Table I, even for 16,383 processors, only fourteen input/output channels are used (at the point source) to keep a sufficient data rate. An input/output channel is equivalent to one port. A port can be associated with a network interface card, a modem, a serial bus, a parallel bus or any other physical layer computer connection hardware.

The invention preferably uses heterogeneous cluster nodes to decrease cluster price performance ratio. In the prior art, clusters of computers used in parallel processing traditionally required homogeneous machines; and further, these machines were typically the fastest available. A primary reason for these constraints of the prior art was due to processor balancing. That is, if there is any processor node cross communication, then the speed of the cross operation is limited to the slowest processor speed (a serial operation). Therefore, to increase overall system performance, the prior art strove to have clusters of processors operating at the same speed, with each processor at the fastest available speed. Rather than use this cluster model, the invention preferably utilizes thread-based processing instead. Computer "threads" are a combination of the same program with a different program counter and a different stack pointer. Threads may have a fixed time slice; and each thread accesses its own data and interprets its own mathematical functions.

Threads are preferably programmed with an identical set of functions. When the functions are requested, and the data is received (per thread), the functions are then applied to the data. If the time slice for each thread is defined to produce the same performance as all other threads in the cluster then (with efficient data and function call allocation) the speed of each process is the speed of each associated thread. By having a thread the lowest common denominator, the invention is able to mix different computers at different speeds, that is, in a heterogeneous cluster or array, and yet maintain a balanced system.

To achieve improved performance in a cluster, according to the preferred embodiment of the invention, there are two general goals. First, it is desirable to have efficient allocation of problem sets; and the invention meets this goal, preferably, through the Howard Cascade. Secondly, it is desirable to have efficient resource allocation; and the invention meets this goal, preferably, through the Howard Resource Queue, defined below in connection with FIG. 4A.

Figure 4A:
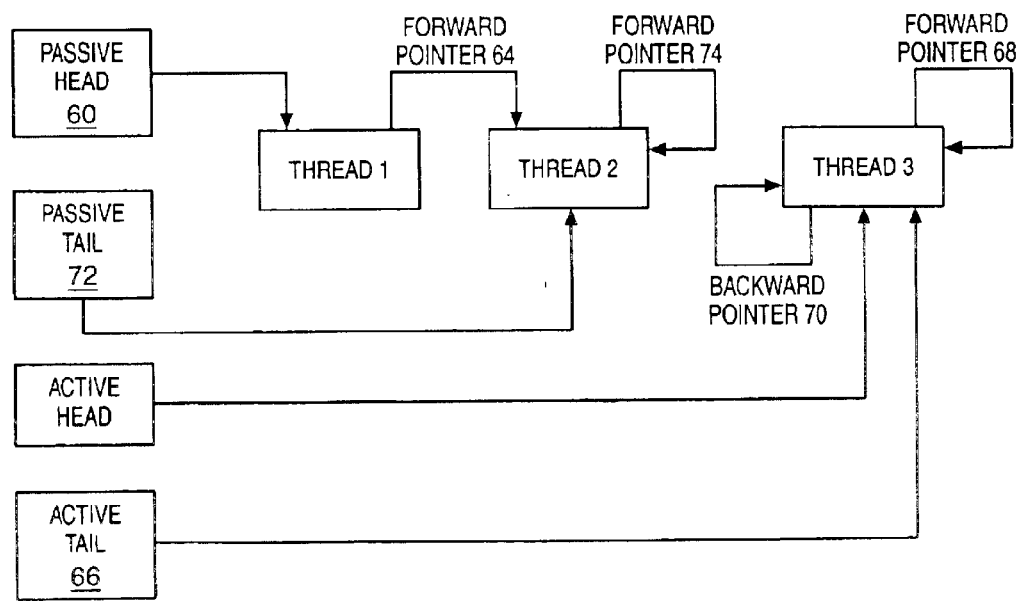
FIG. 4A schematically illustrates the Howard Resource Queue used to obtain efficient resource allocation in accord with the invention.

Specifically, FIG. 4A shows a single link linked list and a doubly linked link list. In order to allocate a resource (like a thread), the following steps are preferably performed:

1) Using the Passive Head Link 60, access the first passive queue node ("Thread 1")
2) Change the Passive Head link to the forward pointer 64 of Thread 1.
3) Using the Active Tail link 66, access the last active queue node ("Thread 3").
4) Change the Thread 3 forward pointer 68 to Thread 1.
5) Change the Active Tail link 66 to Thread 1.
6) Change the passive queue node's backward pointer 70 to the prior Active Tail link 66.

In order to de-allocate a resource, the following steps are preferably performed:

1) Using the link location currently in use, access the Active portion of the queue
2) Change the forward pointer of the node pointed to by the backward pointer of the current active portion of the queue to the forward pointer of the active portion of the queue
3) Change the backward pointer of the node pointed to by the forward pointer of the current active portion of the queue to the backward pointer of the current active portion of the queue
4) Using the Passive Tail link 72 change the forward pointer 74 of the Passive tail link 72 to the current active portion of the queue
5) Change the Passive Tail Pointer to the current active portion of the queue The allocation/de-allocation methods of FIG. 4A offer one way to get resources without searching for the next available resource. However, these methods are used most effectively when as many threads as possible are allocated to a given job from as many cluster nodes as possible. Efficient allocation of threads is preferably accomplished by randomizing the order of the threads in the Passive List. Because of the linear method of allocating and de-allocating threads, randomization is retained; and, without any special algorithms, there is a near-optimum problem set allocation across the cluster.

In that the invention preferably utilizes the Internet to network between computing users and the cluster, the input speed of the datasets is preferably matched to assure high performance. This matching is made possible via the "Home Node" (e.g., Home Node 26a, FIG. 1), which itself is for example a Howard Cascade of sufficient size to generate the desired parallel data transfer rate. The Home Node thus includes an array of computers described herein as "class nodes." The following steps help ensure that the input speed is maintained through the Home Node:

Divide the transfer rate of the connected user by the speed of the network interface cards (assuming that the network interface cards all operate at the same speed.

Allocate the required number of class nodes in Home Node to assure that the bandwidth generated matches or exceeds the users transfer rate.

Move the data into the selected class nodes as the data arrives.

When the cluster nodes are required, the data pointer is set to the appropriate Home Node. A cluster or function node is an operational computer or thread which calculates the values of the parallelized algorithms. A Home Node is a group of operational computers or threads which allocate the data/problem set across multiple function nodes. The Home Node is not a single computer or thread but a cascade of computers or threads. The exact number active at any one time is a function of the maximum input speed (connect speed) of the accessing user.

The combination of the rapid allocation, automatic bandwidth matching, and efficient problem set distribution signifies that machines of different types and speeds can be used effectively within the cluster, providing a significant advantage of the invention.

Figure 4B:
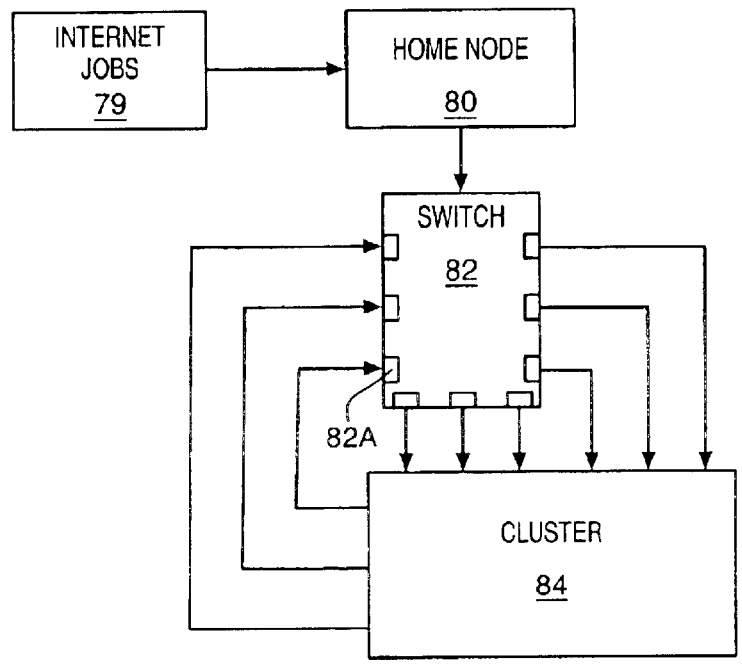
FIG. 4B illustrates switch operations with a Home Node and cluster of the invention.

Connecting the Home Node with the cluster nodes (the combination of which is for example cluster 26, FIG. 1) is illustrated more fully in FIG. 4B. As shown, Home Node 80 distributes functions and data (labeled "Internet Jobs 79") through the switch 82. The cluster 84 also distributes data through switch 82. The I/O bandwidth of the system (e.g., cluster 26, FIG. 1) is thus limited by the total internal bandwidth of switch 82, including the speed of data and functions received from the Internet. For example, if the total switch I/O bandwidth is 3 Giga Bits/second and the Internet connection requires 1.5 Mega Bits/second (current T1 speeds), then the bandwidth left for the cluster 84 is only 2.9 Giga Bits/second. If each switch port 82a consumes 100 Mega Bits/second, then a total of thirty cluster nodes (computer input /output ports) can be supported in cluster 84 while allowing data (e.g., Internet Jobs 79) to stream from the Internet.

Unlike networks or traditional clusters, cluster 84 does not require hubs and routers; it only uses a switch (or a multiplicity of switches). Switch 82 allows groups of two TCP/IP ports 82a to be connected at the same time. If one of the ports 82a is already connected, then a new connection must wait until after the first connection is dropped. However, as discuss above, the geometry of the Howard Cascade, when used as discussed, always guarantees that all required connections are available when required.

Home Node 80 includes one or more computers connected to the Internet 79, and, accordingly, may also be a cluster. When an Internet connection is made, the functions to be accessed are transmitted via switch 82 to a cluster node and/or thread. If the cluster node and/or thread needs to perform a cascaded distribution, it does so via switch 82 as per the prior discussion. Once the cluster node and thread has its function list and no longer needs to cascade function lists to other cluster nodes and threads, it requests (via switch 82) its data from the appropriate Home Node class node. When the data is ready to be sent to the cluster node thread, it is sent via switch 82. The data is then processed by the cluster node thread. When the results are ready to send to another cluster node thread, or the Home Node, this too is done through switch 82, as discuss above.

In operation, switch 82 physically connects to each node in cluster 84 and in Home Node 80, each with a TCP/IP address. If additional ports 82a are needed (i.e., a larger switch is required), then an additional switch is connected with the cluster nodes (and/or with Home Node nodes) to increase the cluster size.

Figure 4C:
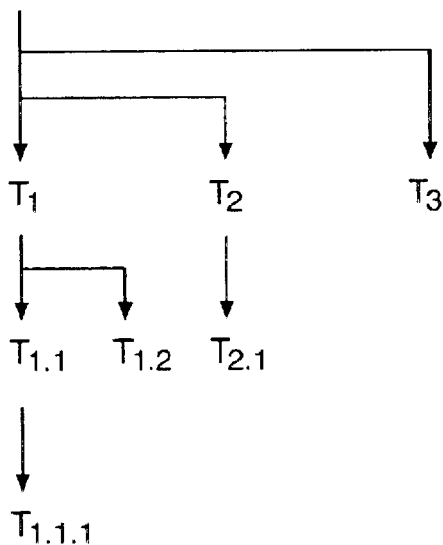
FIG. 4C illustrates a relationship between cluster strips and threads, in accord with the invention.

FIG. 4C illustrates the relationship between cluster "strips" and threads. The number of threads in a "strip" equals the associated cascade level less one. For example, the number of threads in $Strip_1$ is 3. This is equivalent to cascade level 2. The number of threads in $Strip_2$ is 1, which is equivalent to cascade level 1. The number of threads in $Strip_3$ is 0, which is equivalent to cascade level 0. To cover a full strip's worth of data, the first strip needs to have addresses for the other nodes in a cascade. Given a cascade of level X, a strip at $X_N$ signifies that $y=c\,(2^{N-1}-1)$, where N is the cascade level equivalent for a strip.

One issue with Internet based parallel computing involves the rapid detection and mitigation of computer dropouts. That is, the issue involves (a) detecting when a computer in the array is off-line before its portion of the work is completed and (b) replacing that computer with one that is still on-line. With the Howard Cascade of the invention, each portion of the hierarchy tracks every computer that it calls. Thus, the monitoring of the computers is accomplished in parallel. When a dropout is detected, a dropped computer message is sent to the point source allowing the point source to pass a new computer address to the suspect computer. One mechanism to detect the suspect computer is the non-receipt of a message that processing is "OK" before the receipt of a message that processing is complete.

In the preferred embodiment, a user (e.g., a user at computer 30, FIG. 2) communicates with a cluster (e.g., cluster 26, FIG. 1) through the use of a Dynamic Link Library, or "DLL." As known in the art, a DLL library consists of three parts: operational functions, control functions, and data definitions. The operational functions are the list of supported mathematical operations, a list that is often upgraded. Currently, the supported operational functions are:

Add (integer, real, array, matrix), subtract (integer, real, array, matrix), multiply (integer, real, array, matrix), divide (integer, real, array, matrix), transpose, zero matrix, identity matrix, partition matrix, invert matrix, row_echelon_form, column_echelon_form, cross_product, inner_product, determinant, eigenvalues, auto_correlation, absolute_value, arc_cosine, arc_sine, arc_tangent, beta, bilinear_interpolation, binomial_expansion, broyden, boxcar_average, chebyshev_polynomial_expansion, chi_square_cutoff_value, chi_square_probability, circle_radius_three_point, compute_polynomial_probability, compute_polynomial_area, compute_cluster_center, compute_hessenberg_form, compute_gamma, cosine, cramer, curve_fitting, duplicate_vector, exponentiation, factorial, fast_fourier_transform, filter, find_roots, gauss_cutoff, gauss_probability, gauss_integral, gauss_seidel_iteration, hilbert, histogram, householders_tri_diaginal, hyperbolic_sine, hyperbolic_cosine, hyperbolic_tangent, integral, integral_using_romberg, integral_using_simpsons_rule, interpolation, interpolation_spline, kraging, log, make_integer, minimum_value, minimum_curvature_spline_surface, moment, newtons_method, normal_of_an_array, polynomial_evaluation, polynomial_fit, polar_contour, polar_surface, sine, rounding, wavelet_transform The control functions allow the user to send or receive information, group functions, repeat groups, destroy threads, create threads. The data definition allows the user to define arrays, matrices, integers, and real numbers, for use by the operational functions.

In a cluster of the invention, it is important to be able to detect when a particular computer (node) is either not functioning properly or is not communicating. There are three levels of error detection within the cluster in accord with the preferred embodiment of the invention. The first level is the TCP/IP level. When messages are sent from the Home Node to the cluster, it should receive a message acknowledgement. If after multiple attempts the message acknowledgement does not occur, then it is assumed that the current node is down. During a cascade TCP/IP transfer (since there may not be a direct connection between the message transmitting node and the Home Node) if the message acknowledgement does not occur, then a "Lost Node" message is created by the message transmitting node and sent to the Home Node. This "Lost Node" message contains the TCP/IP address of the non-responding node.

The second error detection level is facilitated through a message internal Cyclic Redundancy Check. Since this check involves computation, computation errors result in a bad message check. If after multiple requests a good message is not detected, then either the Home Node automatically detects the error or receives a "Lost Node" message from a cascading node.

The third error detection level is facilitated by a no completion status. When the current node/thread has completed processing for a particular job, it sends a response. If no response has occurred within the maximum time period, then either the Home Node automatically detects the error or receives a "Lost Node" message from a cascading node.

When sufficient errors have occurred on a particular node, then that node is taken offline, such as through the following steps:

1) Send a "Kill Threads" message to the target node.
2) Search through the active list and delete all entries with the target TCP/IP address.
3) Search through the passive list and delete all entries with the target TCP/IP address.
4) Display a "Disconnect Node" message on the monitor.
5) Disconnect the network cable from both the switch and the node.
6) Remove the node the rack.

Similarly, when a node is brought on-line, that node is incorporated into the cluster, such as through the following steps:

1) Place the node on the rack.
2) Connect the network cable to an empty switch port and the network interface card
3) Display a "Define Threads" message on the monitor
4) Enter the number of threads, thread time slice, and the node TCP/IP address
5) Send a "Define Threads" message to the TCP/IP address.
6) Define HomeNode thread nodes for the passive thread queue.
7) Randomize the thread node locations so that they occur throughout the passive thread queue.

Figure 5B:
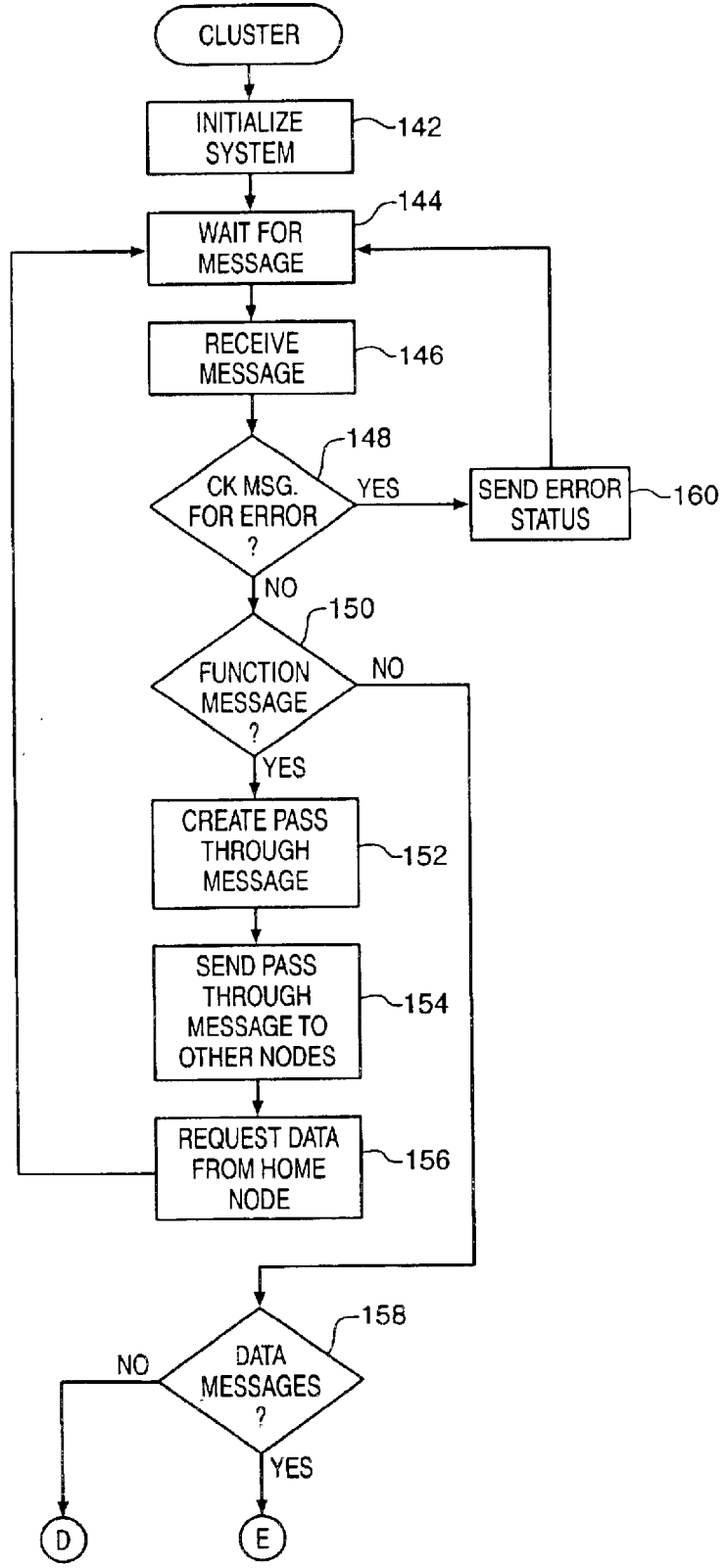
FIG. 5B shows one processing flow for use with the invention and particularly involving steps taken at a cluster of the invention.

The invention provides many processing steps. These steps are explicitly set forth in the U.S. Provisional Application Nos. 60/141,208, filed Jun. 25, 1999, and 60/188,659, filed Mar. 10, 2000, and specifically within source code therein, from which this application claims priority. Nevertheless, FIGS. 5, 5A, 5B, 5C, 5D, 5E, 5F, 5G illustrate certain flowcharts illustrating application of the invention from an end user computer (e.g., a computer at customer entity 22, FIG. 1), to the home node, and to the cluster (e.g., such as the Cluster 26, FIG. 1). Specifically, FIG. 5 illustrates process methodology occurring at the end user computer, FIG. 5A illustrates process methodology occurring at the home note, and FIG. 5B illustrates process methodology occurring at the cluster. FIG. 5C, FIG. 5D, FIG. 5E, FIG. 5F, FIG. 5G illustrate library actions and interconnections (e.g., connectors A–F) with FIG. 5, FIG. 5A, FIG. 5B and other flowcharts of FIGS. 5C–5G. As used within these flowcharts: 'a Howard Strip" indicates the associate nodes/threads which receive a common list of TCP/IP addresses for communication purposes; "queue" denotes a list of system resources (threads, memory, sockets, etc.); "quiesce" mean to signifies ensuring that all threads of an associated note have ceased processing problems; "head and tail pointers" denote the link list of the list pointer (head pointer) and the link list end of list pointer (tail pointer); and "parallelization" denotes the conversion of a mathematical function or algorithm to its mathematical series equivalent.

FIG. 5 shows a flow chart illustrating steps and functions that preferably occur at or through the end user computer (e.g., computer 3, FIG. 2). The flow chart of FIG. 5 is described more fully in Table III; and these skilled in the art should appreciate that these steps are non-limiting, are typically not in processing order, and that not all steps are required for functionality.

TABLE III

Steps for Flow Chart of FIG. 5

| | |
|---|---|
| Step 102 | Initialize System - allocate memory, initialize flags, build ports, queues, sockets and threads. |

TABLE III-continued

Steps for Flow Chart of FIG. 5

| | |
|---|---|
| Step 104 | Function Selection - build a list of the functions to be used on the data. |
| Step 106 | Data "Parallelization" - breakup the data into manageable pieces. For example, if the data to be processed consists of a single 100 by 100 matrix, that matrix can be transformed into one hundred 10 by 10 matrices, permitting data processing by one hundred machines in parallel. |
| Step 108 | Cost Computation - calculate the number of MIPS times the number of seconds of processing by taking the functions to be applied times the amount of data plus the projected up load time. This time factor is multiplied by the cost per MIPS factor to give the estimated cost of the transaction. |
| Step 110 | Cost Approval - approval can come in many forms, such as pre-approval (during initialization), the user approves the computed cost by selecting the cost approved button on the display, the customer entity has prepaid for approval, a manager approves the transaction, or some other approval mechanism. |
| Step 112 | Packetize Functions and Data - create one or more TCP/IP message packets containing the found functions, their parameters, and the data. |
| Step 114 | Send Packets to HomeNode (shown in flow chart of FIG. 5A) - connect to the HomeNode, send the packets to HomeNode, disconnect from the HomeNode. |
| Step 116 | Receive Response - wait for a message from the Home Node. |
| Step 118 | Error Response - if the received response message is an error message, then display the error message to the user. |
| Step 120 | Display Error - convert the data received to a displayable message, show the displayable message to the user. |

FIG. 5A shows a flowchart illustrating steps and functions that preferably occur at or through the Home Node. The flow chart of FIG. 5A is described more fully in Table IV; and those skilled in the art should appreciate that these steps are non-limiting, are not listed in sequential order, and that not all steps are required for functionality.

TABLE IV

Steps for Flow Chart of FIG. 5A

| | |
|---|---|
| Step 124 | Initialize System - allocate memory, initialize flags, build ports, queues, sockets and threads. |
| Step 126 | Wait for Message - wait for a TCP/IP message from the network. |
| Step 128 | Check Message for Error - upon receipt of a message check the CRC of the message |
| Step 130 | Check Message Type - extract the message type from the message |
| Step 132 | TRANSACTION - is the current message a transaction type message |
| Step 134 | GEOMETRY - is the current message a cluster geometry type message |
| Step 136 | CONTROL - is the current message a cluster control type message |
| Step 138 | Save Error - is this current message of unknown type. If YES, then display the error and save the error data. |
| Step 139 | Send Error Status - send a message containing the error data back to the calling system |

FIG. 5B shows a flowchart illustrating steps and functions that preferably occur at or through the cluster (e.g., cluster 26, FIG. 1). The flow chart of FIG. 5B is described more fully in Table V; and those skilled in the art should appreciate that these steps are non-limiting, are not listed in sequential order, and that not all steps are required for functionality.

TABLE V

Steps for Flow Chart of FIG. 5B

| | |
|---|---|
| Step 142 | Initialize System - Allocate memory, initialize flags, build ports, build initial sockets and threads. |
| Step 144 | WAIT FOR MESSAGE - wait for a TCP/IP message from the Home Node |
| Step 146 | RECEIVE MESSAGE - receive the TCP/IP message. |
| Step 148 | Check Message For Error - Check the received message for any errors. |
| Step 150 | Function Message - check if the message is a function message |
| Step 152 | Create Pass Through Message - create a message to send to the Howard Strip associated with the current thread. |
| Step 154 | Send Pass Through message to other Nodes - transmit the message to the next level threads in the current Howard Strip. |
| Step 156 | Request Data From HomeNode - send a data request message to the HomeNode giving the current Howard Cascade position. |
| Step 158 | Data Message - check if the message is a data message |
| Step 160 | Send Error Status - transmit a message error status message to the HomeNode |

Figure 5C:
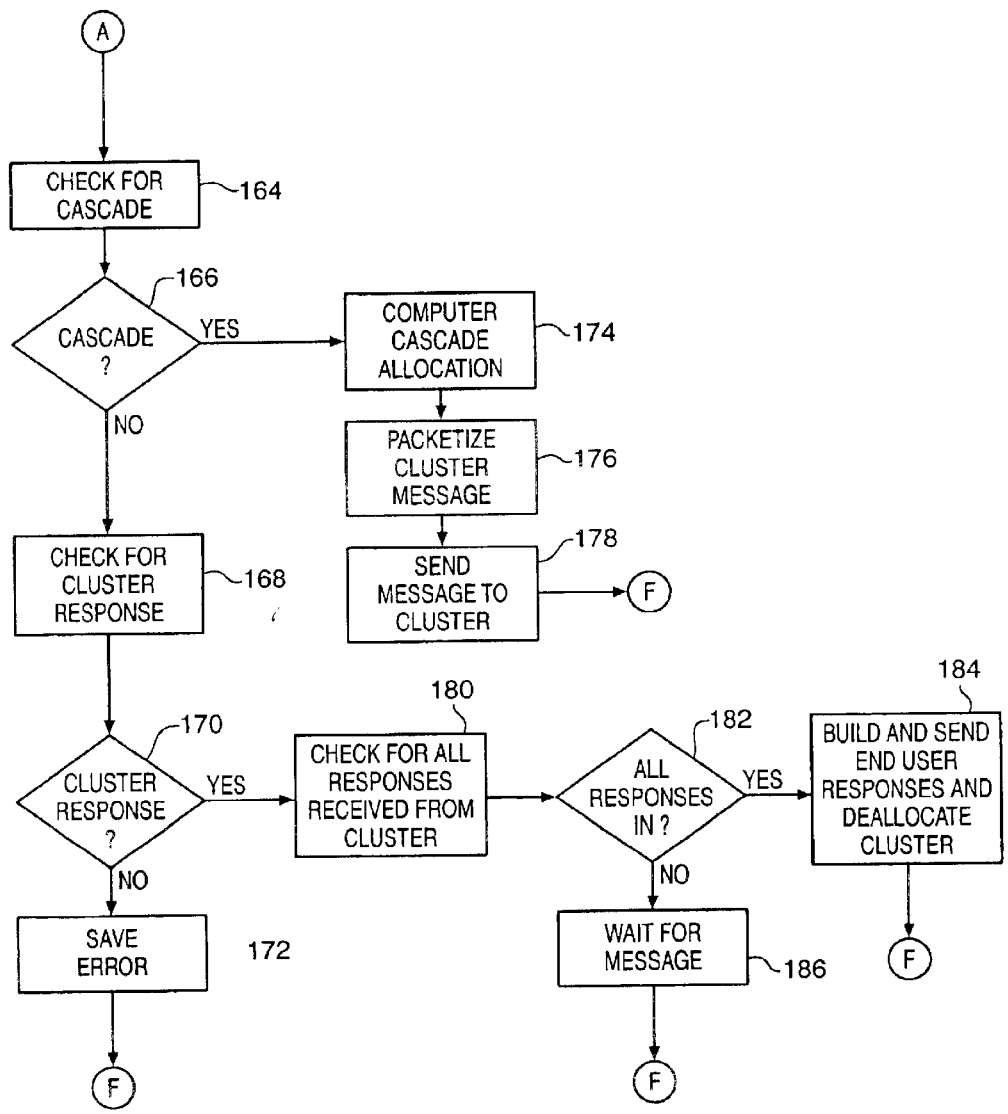
FIGS. 5C, 5D, 5E, 5F, and 5G show flow charts of library actions in accord with the preferred embodiment of the invention.

Table VI describes the flowchart of library actions in FIG. 5C. Those skilled in the art should appreciate that each step of Table VI is not necessarily required and that steps are not necessarily described in sequential processing order.

TABLE VI

Steps for Flow Chart of FIG. 5C

| | |
|---|---|
| Step 164 | Check For Cascade - check the geometry type |
| Step 166 | CASCADE - determine if the geometry type is cascade |
| Step 168 | Check For Cluster Response - check the message identity to determine is the message came from the cluster |
| Step 170 | CLUSTER RESPONSE - check for cluster response message |
| Step 172 | SAVE ERROR - save the value error data |
| Step 174 | Computer Cascade Allocation - compute the TCP/IP addresses of the current cascade strip associated with the out-going message.. |
| Step 176 | Packetize Cluster Message - build a TCP/IP message to be sent to the current high level node thread. |
| Step 178 | Send Message To Cluster - use the Send function to transmit the current message to the high level node thread. |
| Step 180 | Check for All Responses Received From Cluster - check the message which was received from the cluster to determine if all of the response messages required have been received. |
| Step 182 | ALL RESPONSES IN - check the message for all responses for current job |
| Step 184 | Build and Send End User Responses and Deallocate Cluster - build a response message as a function of the received data from the cluster. |
| Step 186 | Wait For Messages - wait to receive more messages from the cluster until all expected messages have been received. |

Figure 5D:
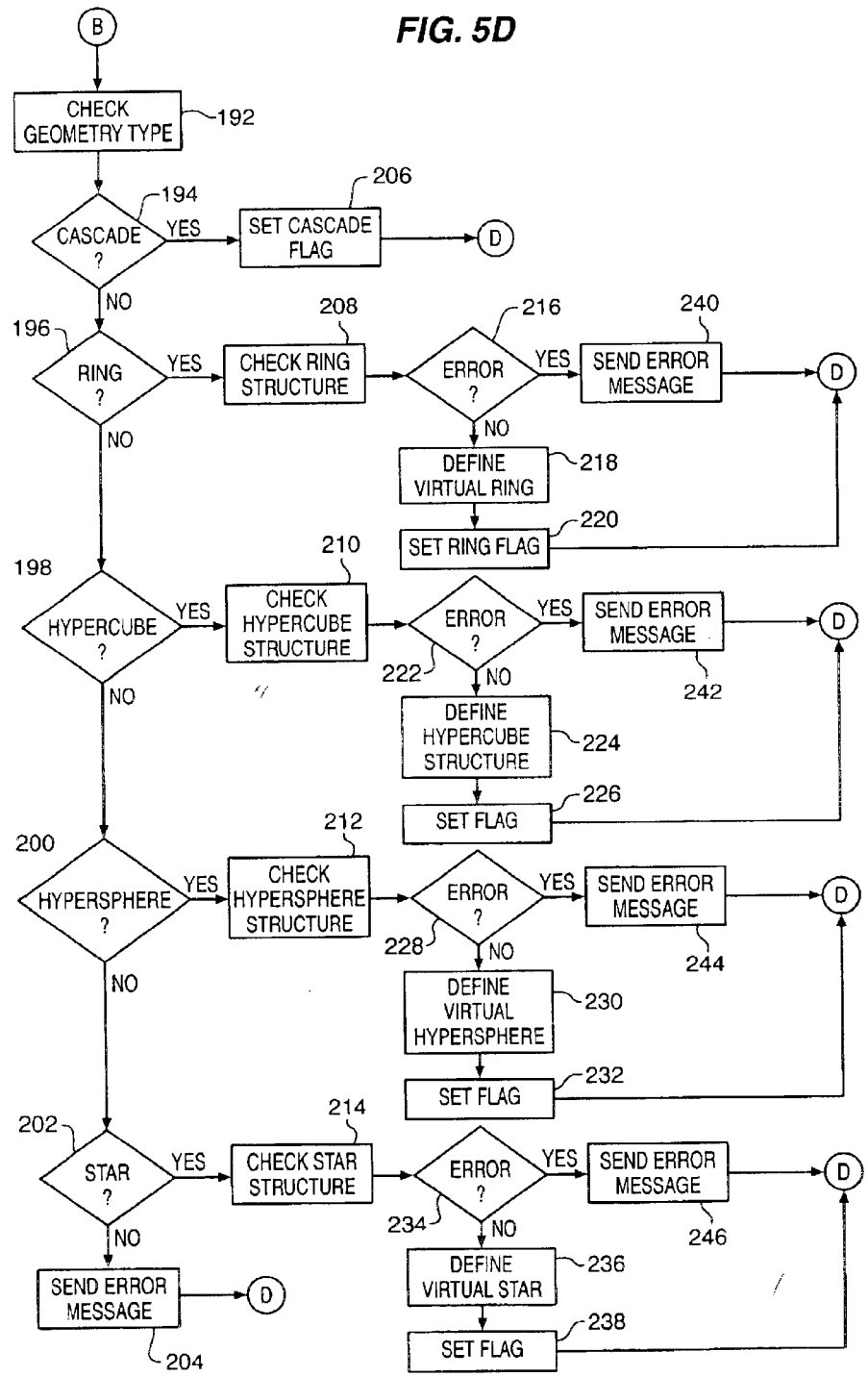

Table VII describes the flowchart of library actions in FIG. 5D. Those skilled in the art should appreciate that each step is not necessarily required and that steps are not necessarily described in sequential processing order.

TABLE VII

Steps for Flow Chart of FIG. 5D

| | |
|---|---|
| Step 192 | Check Geometry Type - determine the type of geometry to be used by the cluster. |
| Step 194 | CASCADE - set the cluster geometry type to Howard Cascade. |
| Step 196 | RING - set the cluster geometry type to Ring configuration. |
| Step 198 | HYPERCUBE - set the cluster geometry type to Hypercube configuration |
| Step 200 | HYPERSPHERE - set the cluster geometry type to Hypersphere configuration |
| Step 202 | STAR - set the cluster geometry type to Star configuration |

TABLE VII-continued

Steps for Flow Chart of FIG. 5D

| | |
|---|---|
| Step 204 | Send Error Message - is the current geometry of unknown type; if YES, then display the error and save the error data |
| Step 206 | Set Cascade Flag - set the geometry flag to Cascade Network. |
| Step 208 | Check Ring Structure - determine if the requested connectivity matches a Ring network geometry. |
| Step 210 | Check Hypercube Structure - determine if the requested connectivity matches a Hypercube network. |
| Step 212 | Check Hypersphere Structure - determine if the requested connectivity matches a Hypersphere network. |
| Step 214 | Check Star Structure - determine if the requestered connectivity matches a Star network. |
| Step 216 | ERROR - determine if there is a Ring network connectivity error. |
| Step 218 | Define Virtual Ring - send information to all node threads defining the Ring network. |
| Step 220 | Set Ring Flag - set the geometry flag to Ring Network |
| Step 222 | ERROR - determine if there is a Hypercube network connectivity error. |
| Step 224 | Define Hypercube Structure - send information to all node threads defining the Hypercube network |
| Step 226 | Set Flag - set the geometry flag to Hypercube Network |
| Step 228 | ERROR - determine if there is a Hypersphere network connectivity error. |
| Step 230 | Define Virtual Hypersphere - send information to all node threads defining the Hypersphere network |
| Step 232 | Set Flag - set the geometry flag to HyperSphere Network |
| Step 234 | ERROR - determine if there is a Star network connectivity error. |
| Step 236 | Define Virtual Star - send information to all node threads defining the Star network. |
| Step 238 | Set Flag - set the geometry flag to Star Network |
| Step 240 | Send Error Message - transmit the Ring Network error message to the user |
| Step 242 | Send Error Message - transmit the HyperCube Network error message to the user |
| Step 244 | Send Error Message - transmit the HyperSphere Network error message to the user |
| Step 246 | Send Error Message - transmit the Star Network error message to the user |

Figure 5E:
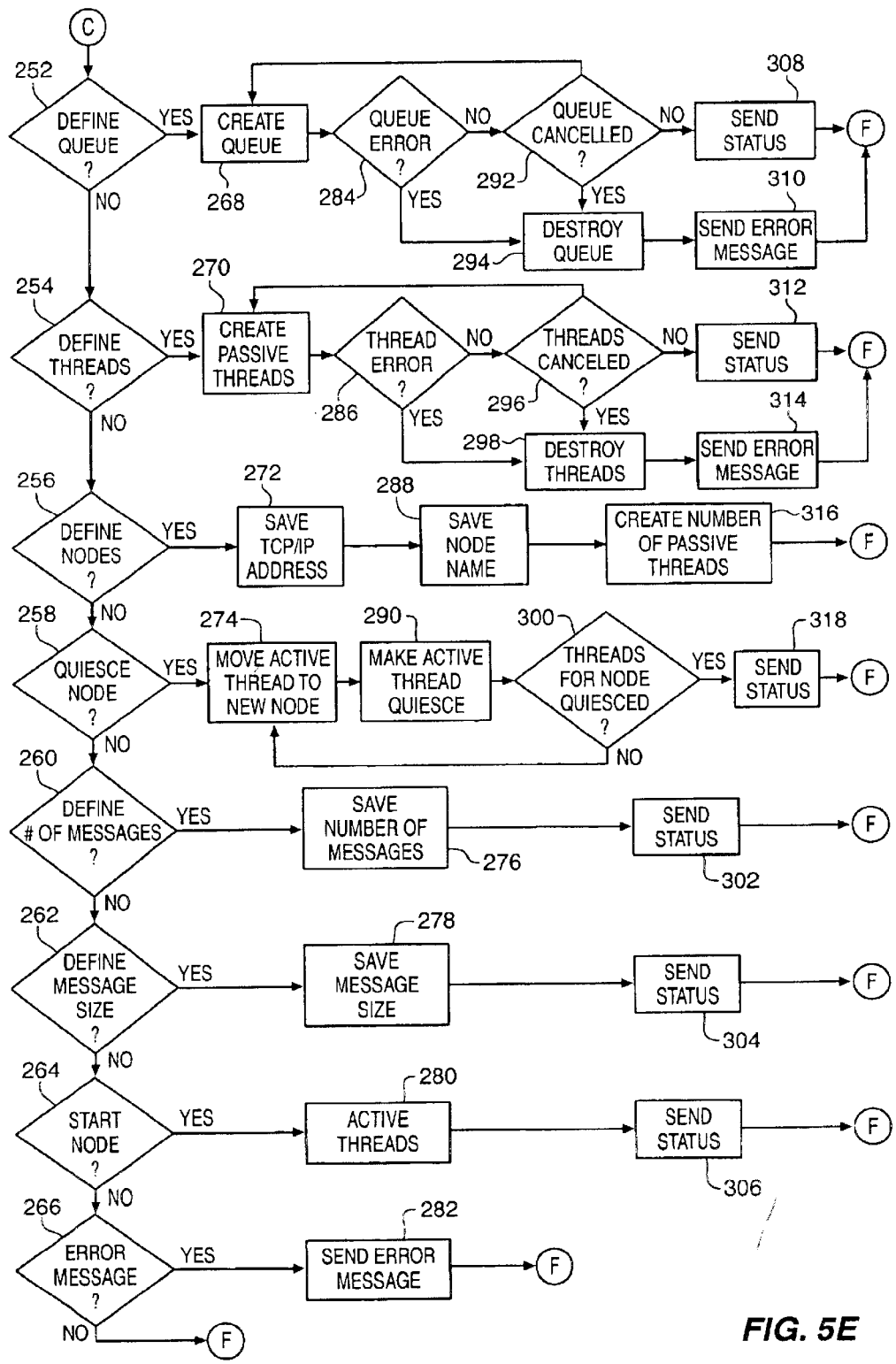

Table VIII describes the flowchart of non-limiting steps of library actions in FIG. 5E. Those skilled in the art should appreciate that each step is not necessarily required and that steps are not generally described in sequential processing order.

TABLE VIII

Steps for Flow Chart of FIG. 5E

| | |
|---|---|
| Step 252 | DEFINE QUEUE - determine whether received message is a define queue message. |
| Step 254 | DEFINE THREADS - determine if the received message is a define threads message. |
| Step 256 | DEFINE NODES - determine if the received message is a define nodes message. |
| Step 258 | QUIESCE NODE - receive a message from the user to shut down all threads in the current node |
| Step 260 | DEFINE # MESSAGES - receive a message from the user (e.g., an dministrator) that defines the number of messages that can be received. |
| Step 262 | DEFINE MESSAGE SIZE - receive a message from the user (e.g., andministrator) that defines the maximum number of bytes a message can contain. |
| Step 264 | START NODE - receive a message from the user (e.g., an administrator) to start a new processor node. |
| Step 266 | ERROR MESSAGE - determine that the message received is unknown. |
| Step 268 | Create Queue - define the queue requested in the received message. |
| Step 270 | Create Passive Threads - determine the passive threads which are needed to be created and create them. |
| Step 272 | Save TCP/IP - define the new TCP/IP addresses and associate them with the newly created threads. |

TABLE VIII-continued

Steps for Flow Chart of FIG. 5E

| | |
|---|---|
| Step 274 | Move Active Thread to New Node - change the queue thread from active to quiesced. |
| Step 276 | Save Number of Messages |
| Step 278 | Save Message Size - place the message size (number of bytes) in the message size definition storage area for use when a message is defined. |
| Step 280 | Active Threads - send a message to the current node which activates all of that nodes threads |
| Step 282 | Send Error Message - an error message was received from the cluster, so pass the error information to the user. |
| Step 284 | QUEUE ERROR - check if the current queue could not be defined. |
| Step 286 | THREAD ERROR - check if the current thread could not be defined. |
| Step 288 | Save Node Name - place the bound name in the node definition structure. |
| Step 290 | Make Active Thread Quiesce - send message to end current active threads activity and make the active thread available for reuse by the Home Node. |
| Step 292 | QUEUE CANCELLED - check if the current queue has been cancelled. |
| Step 294 | Destroy Queue - de-allocate all memory associated with the current queue and set all queues head and tail pointers to NULL. |
| Step 296 | THREADS CANCELLED - check if the current thread has been cancelled. |
| Step 298 | Destroy Threads - send a message to the thread node to exit out of that thread (destroying the thread); and delete the thread from the thread queue. |
| Step 300 | THREADS FOR NODE QUIESCENT - check that all threads in the current node are quiescent. |
| Step 302 | Send Status - transmit a good status message to the user for the DEFINE # MESSAGES message. |
| Step 304 | Send Status - transmit a good status message to the user for the DEFINE MESSAGE SIZE message. |
| Step 306 | Send Status - transmit a good status message to the user for the START NODE message. |
| Step 308 | Send Status - transmit a good status message to the user for the DEFINE QUEUE message. |
| Step 310 | Send Error Message - transmit a bad status message to the user for the DEFINE QUEUE message. |
| Step 312 | Send Status - transmit a good status message to the user for the DEFINE THREADS message. |
| Step 314 | Send Error Message - transmit a bad status message to the user for the DEFINE THREADS message. |
| Step 316 | Create Number of Passive Threads - build a thread creation message; transmit the thread creation message to the current node in the cluster which defines the number of threads available to that node. |
| Step 318 | Send Status - transmit a good status message to the user for the QUIESCENTS NODE message. |

Figure 5F:
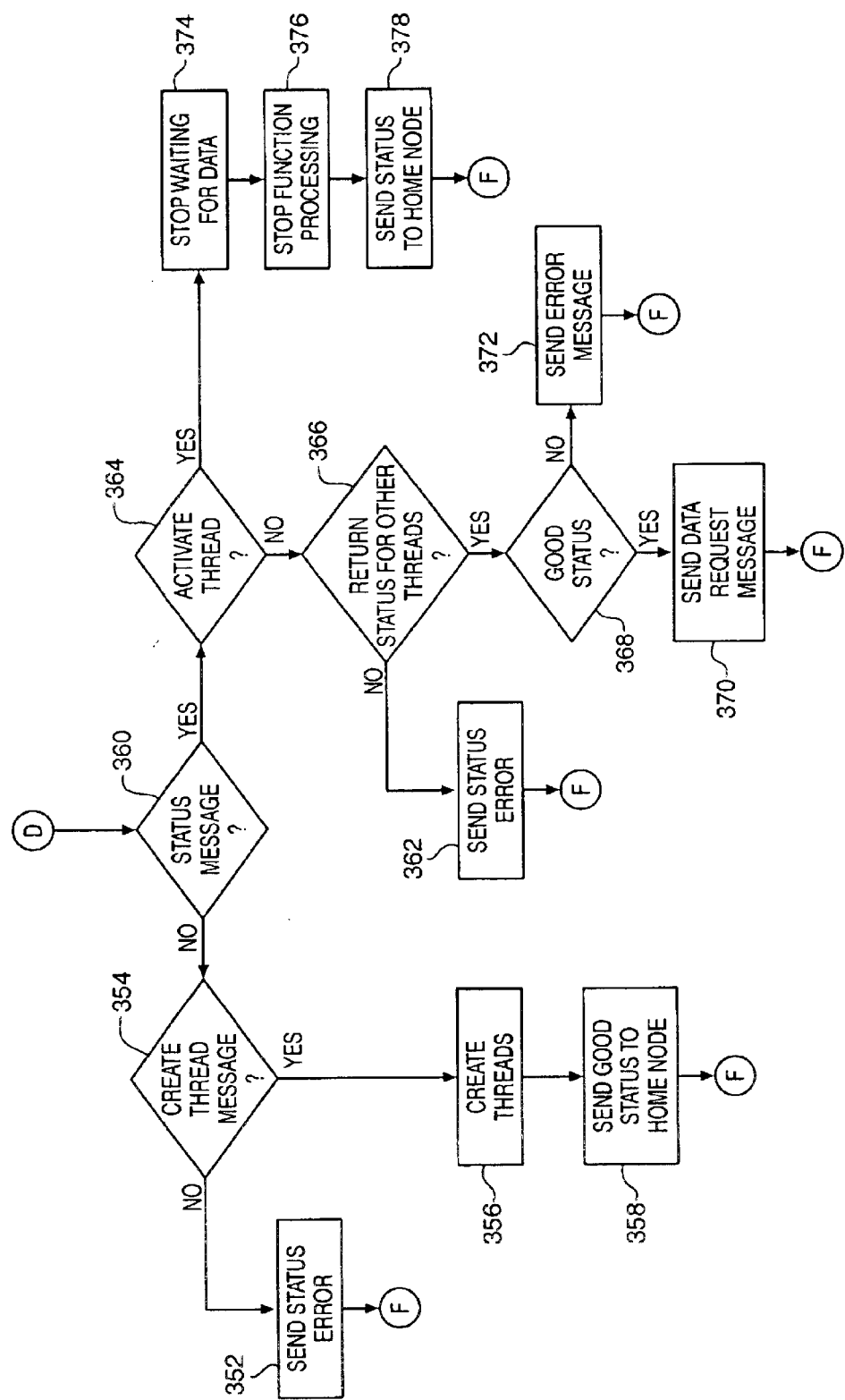

Table IX describes the flowchart of non-limiting steps of library actions in FIG. 5F. Those skilled in the art should appreciate that each step is not necessarily required and that steps are not generally described in sequential processing order.

TABLE IX

Steps for Flow Chart of FIG. 5F

| | |
|---|---|
| Step 352 | Send Status Error - transmit a message error status message to the HomeNode |
| Step 354 | Create Thread Message - check if the message is a Create Thread Message. |
| Step 356 | Create Threads - create the number of threads requested by the Create Thread Message. |
| Step 358 | Send Good Status to Home Node - transmit a good status message to the Home Node. |
| Step 360 | Status Message - check if the message is a Status Message. |
| Step 362 | Send Status Error - transmit an error status message to the Home Node. |

TABLE IX-continued

Steps for Flow Chart of FIG. 5F

| | |
|---|---|
| Step 364 | Activate Thread - check if the message is a Activate Thread message |
| Step 366 | Return Status for Other Threads - check if the message is a Return Status from an associated Thread |
| Step 368 | Good Status - check if the message is a Good Status message |
| Step 370 | Send Data Request Message - transmit a Data Request message to the Home Node. |
| Step 372 | Send Error Message - transmit an error status message to the Home Node. |
| Step 374 | Stop Waiting For Data - clear the waiting for message flag. |
| Step 376 | Stop Function Processing - exit current function process loop in thread |
| Step 378 | Send Status To Home Node - Send good status message to Home Node. |

Figure 5G:
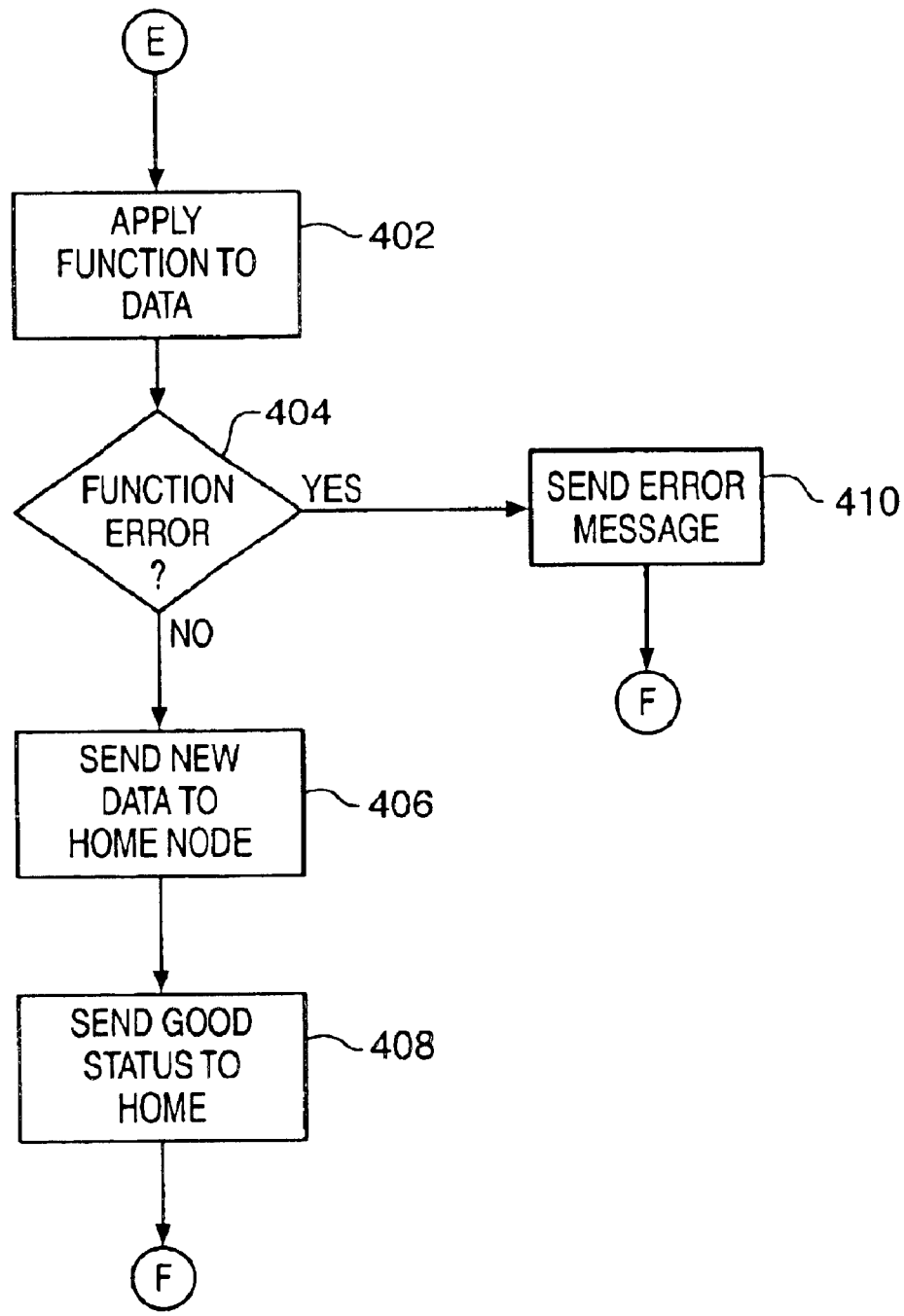

Table X describes the flowchart of non-limiting steps of library actions of FIG. 5G. Those skilled in the art should appreciate that each step is not necessarily required and that steps are not generally described in sequential processing order.

TABLE X

Steps for Flow Chart of FIG. 5G

| | |
|---|---|
| Step 402 | Apply Function to Data - run the currently requested math function on the current thread data. |
| Step 404 | Function Error - check if the function generated an error condition |
| Step 406 | Send New Data to Home Node - transmit the new data to the Home Node |
| Step 408 | Send Good Status to Home Node - transmit a good status message to the Home Node. |
| Step 410 | Send Error Message - transmit |

Figure 6:
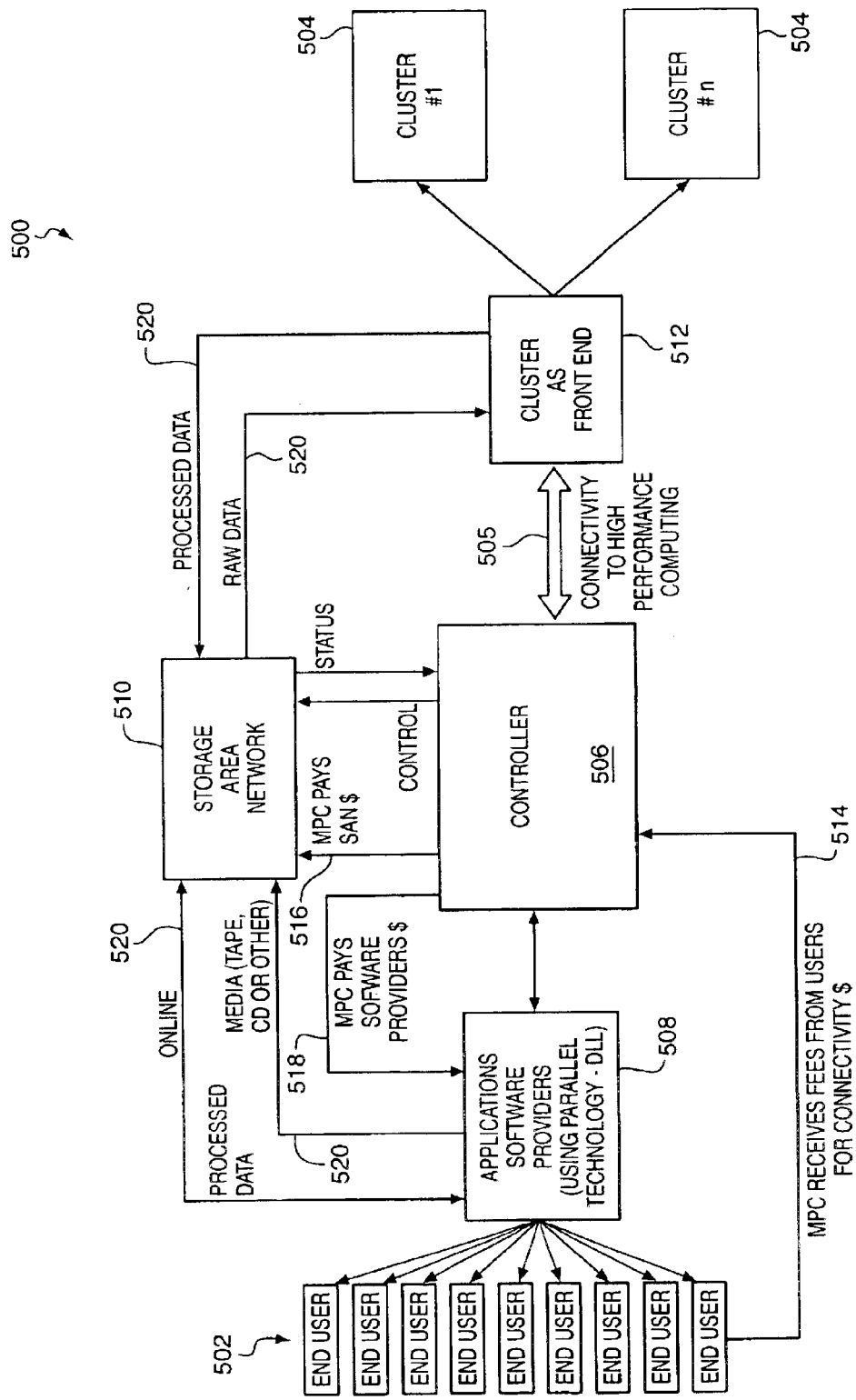
FIG. 6 illustrates revenue-generating transactions through cluster processing according to the invention.

FIG. 6 shows a system 500 constructed according to the invention. System 500 processes functions from one or more end users 502 through one or more clusters 504$_1$ . . . 504$_n$. As in FIG. 1, a controller 506 facilitates such processing by communications with software manufacturers, e.g., a manufacturer 508, to provide speed-enhanced software for users 502. A SAN 510 can be used for intermediate storage, as in FIG. 1. Home Node 512 is also a cluster that serves as the front end to clusters 504, through a high performance network 505, to maintain data parallelization with clusters 504.

As shown, controller 506 makes monetary transactions to and from several non-limiting sources to operate as a business: end users pay fees to controller 506 through transaction 514; controller 506 pays SAN 510, for storage, through transaction 516; controller 506 pays manufacturer 508 through transaction 518. Data transfers to and between users 502 and clusters 504 via several other transactions 520.

Figure 6A:
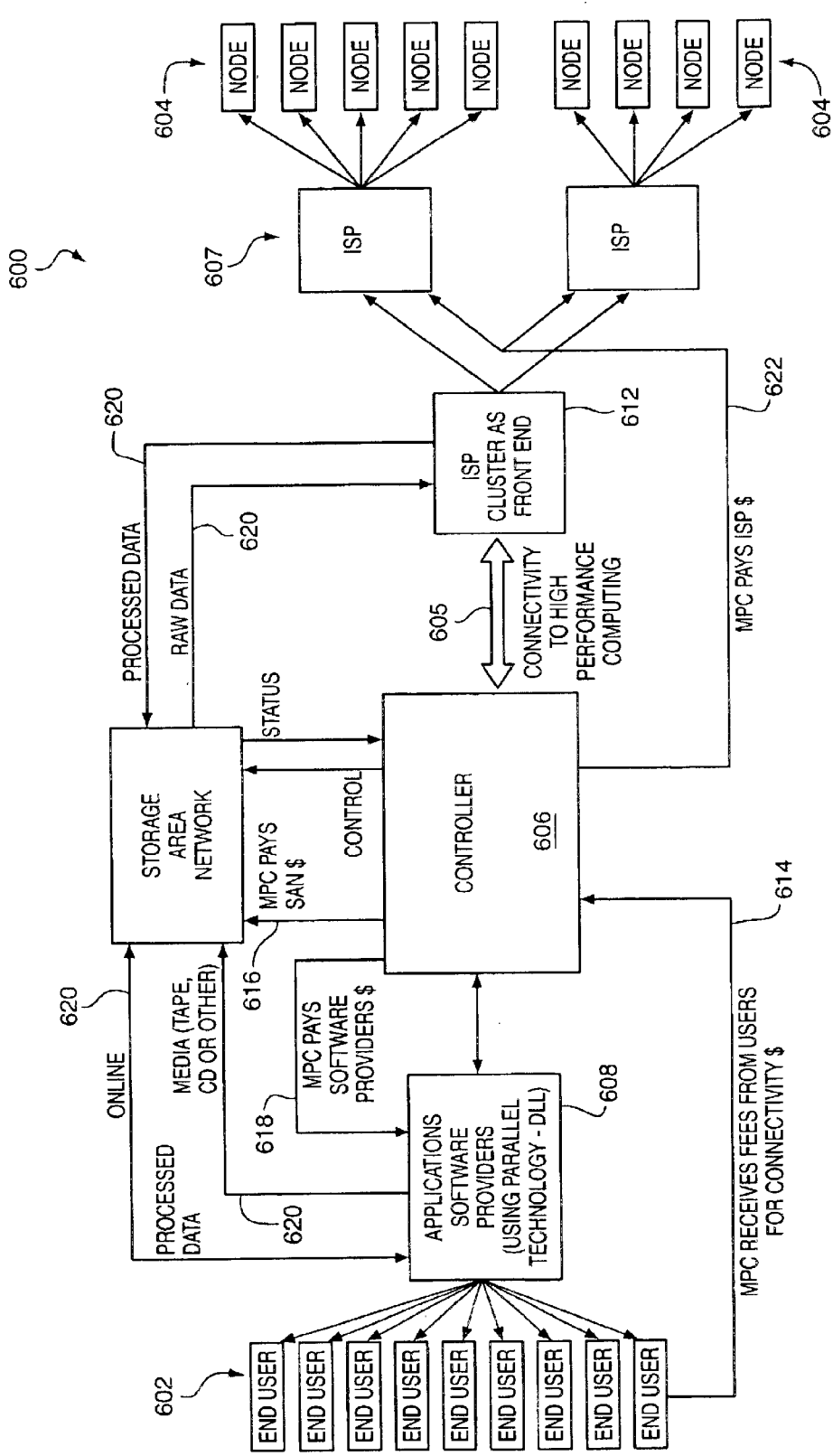
FIG. 6A illustrates revenue-generating transactions and cluster processing through one or more ISPs, in accord with the invention.

FIG. 6A illustrates an alternative system 600 constructed according to the invention. System 600 is similar to system 500, FIG. 6, except that the node clusters are provided through interconnected computers linked to a common ISP. Specifically, system 600 processes functions from one or more end users 602 through one or more clusters 604$_1$ . . . 604$_n$. Each cluster 604 is linked to, and made possible by, an ISP 607. As in FIG. 1, a controller 606 facilitates processing through system 600 by communications with software manufacturers, e.g., a manufacturer 608, to provide speed-enhanced software for users 602. A SAN 610 can be used for intermediate storage, as in FIG. 1. Home Node 612 is also preferably a cluster that serves as the front end to ISPs and clusters 607, 604, through a high performance network 605, to maintain data parallelization with clusters 604.

As shown, controller 606 makes monetary transactions to and from several non-limiting sources to operate as a business: end users pay fees to controller 606 through transaction 614; controller 606 pays SAN 610, for storage, through transaction 616; controller 606 pays manufacturer 608 through transaction 618. Data transfers to and between users 602 and clusters 604 via several other transactions 622. Preferably, controller 606 also pays ISPs 607 via transactions 620; and, in exchange, nodes of cluster 604 are afforded free Internet access through ISP 607. In this way, supercomputing is provided by networked clusters of computers owned by willing ISP participants who share their computer (specifically, one or more threads of their computer) in exchange for free Internet access.

In view of the foregoing, what is claimed is:

1. Network architecture for accelerating execution of a program having one or more algorithms, comprising:
  a computer connected to a network;
  a distributed cluster of nodes connected to the computer through the network;
  a library, associated with each node, accepting requests to accelerate processing of the algorithms; and
  a controller having protocol software to engage the nodes to process the algorithms and return a result to the computer, the controller and nodes having a priori knowledge of logical connections between the nodes to accelerate parallel processing of data therebetween, the controller and cluster being arranged as a Howard Cascade.

2. The network architecture of claim 1, the Howard Cascade ensuring data connections between nodes of the cluster are available when needed.

3. The network architecture of claim 1, the Howard Cascade balancing timing between nodes of the cluster to decrease serial operation and data collisions between the nodes.

4. The network architecture of claim 3, the nodes being balanced such that data transferred between nodes, over a time period, is of equal size, and wherein a cascade depth and a cascade width of the Howard Cascade are equal during parallel processing of the data.

5. The network architecture of claim 3, the nodes being balanced such that data transferred between nodes, over a time period, is of unequal size, corresponding to heterogeneous processing speed of the nodes.

6. A parallel processing system, comprising:
  a home node;
  a plurality of nodes, the home node and plurality of nodes being arranged as a Howard Cascade, the home node and the plurality of nodes having a priori knowledge of logical connections between the nodes to accelerate parallel processing of data there between; and
  a switch operable to switch data connections between the nodes, the home node connected with the switch and operable to distribute algorithm of a program among the nodes for parallel processing, the home node selecting communication between the nodes based upon the algorithms and without the program having knowledge of the communication.

7. The system of claim 6, wherein a cascade depth and a cascade width of the Howard Cascade remain equal during parallel processing.

8. The system of claim 6, wherein internodal communication between the nodes comprises TCP/IP, or any other standard communication protocol.

9. The system of claim 6, wherein the nodes comprise homogeneous processing speed and are balanced such that data transferred between nodes, over a time period, is of equal size.

10. The system of claim 6, wherein the nodes comprise heterogeneous processing speed, wherein data transferred between nodes, over a time period, is of unequal size, which to balance the total computation and communication time.

11. The system of claim 7, wherein the nodes process one or more threads during parallel processing of a program.

12. The system of claim 11, each of the threads having an identical set of functional capabilities.

13. The system of claim 11, the threads deriving from a plurality of jobs.

14. The system of claim 6, the nodes comprising heterogeneous computers.

15. The system of claim 6, the nodes comprising homogeneous computers.

16. The system of claim 6, wherein each node has a free data connection for internodal communication to avoid data collision.

17. The system of claim 6, wherein each of the nodes is operable to determine whether called nodes function properly.

18. The system of claim 17, wherein each of the nodes detects non-receipt of a message to determine malfunction of the lower-hierarchy called nodes.

19. The system of claim 6, the home node operable to distribute data and algorithms among the nodes such that as many nodes as possible are utilized and such that each of the nodes consumes the least number of threads.

20. The system of claim 6, the home node distributing data and functions among the nodes with predetermined cascade depth and width, to process a predetermined number of threads per node.

21. The system of claim 6, the nodes being arranged as a Howard Cascade, each node comprising a library of functions that are processed by the Howard Cascade.

22. The system of claim 21, the library comprising a Dynamic Link Library.

23. The system of claim 6, the home node distributing a program among the nodes such that data connections between nodes are available for use at a predetermined time.

* * * * *

UNITED STATES PATENT AND TRADEMARK OFFICE
CERTIFICATE OF CORRECTION

PATENT NO. : 6,857,004 B1  Page 1 of 1
DATED : February 15, 2005
INVENTOR(S) : Kevin D. Howard, Gerard A. Verbeck and Scott A. Smith It is certified that error appears in the above-identified patent and that said Letters Patent is hereby corrected as shown below:

Title page,
Item [75], Inventor, "Kevin D. Howard" should read -- Kevin Howard --.

Column 8,
Line 22, "intermodel" should read -- intermodal --.
Line 46, "use" should read -- uses --.

Column 11,
Lines 17 and 33, "discuss" should read -- discussed --.

Column 13,
Line 10, "Remove the node the rack" should read -- Remove the node from the rack --.

Column 14,
Line 7, "breakup" should read -- break up --.

Column 16,
Line 64, "which are needed" should read -- which need --.

Column 17,
Line 11, "nodes" should read -- node's --.

Column 19,
Line 5, "transactions 622" should read -- transactions 620 --.
Line 50, "of data" should read -- update --.

Signed and Sealed this

First Day of November, 2005

JON W. DUDAS
*Director of the United States Patent and Trademark Office*